United States Patent
Fu et al.

(10) Patent No.: US 10,462,341 B1
(45) Date of Patent: Oct. 29, 2019

(54) AUTOMATIC GREETINGS BY OUTDOOR IP SECURITY CAMERAS

(71) Applicant: Kuna Systems Corporation, Burlingame, CA (US)

(72) Inventors: Sai-Wai Fu, Los Altos, CA (US); Haomiao Huang, Redwood City, CA (US); Amauri Campos Melo, Burlingame, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 222 days.

(21) Appl. No.: 15/593,570

(22) Filed: May 12, 2017

Related U.S. Application Data

(63) Continuation of application No. 14/859,867, filed on Sep. 21, 2015, now Pat. No. 9,654,678, which is a continuation of application No. 14/164,540, filed on Jan. 27, 2014, now Pat. No. 9,143,741, which is a continuation-in-part of application No. 13/921,597, filed on Jun. 19, 2013, now Pat. No. 9,172,917, said application No. 14/859,867 is a continuation of application No. 14/205,946, filed on Mar. 12, 2014, (Continued)

(51) Int. Cl.
| | |
|---|---|
| *G08B 13/00* | (2006.01) |
| *G08B 1/08* | (2006.01) |
| *G08C 17/00* | (2006.01) |
| *H04M 1/00* | (2006.01) |
| *G05B 23/02* | (2006.01) |
| *H04N 5/225* | (2006.01) |
| *G06F 3/16* | (2006.01) |
| *H04N 5/232* | (2006.01) |
| *H05B 37/02* | (2006.01) |

(52) U.S. Cl.
CPC ............ *H04N 5/2256* (2013.01); *G06F 3/16* (2013.01); *H04N 5/2254* (2013.01); *H04N 5/23206* (2013.01); *H05B 37/0272* (2013.01)

(58) Field of Classification Search
CPC ............... H04N 5/2256; H04N 5/2254; H04N 5/23206; G06F 3/16; H05B 37/0272
USPC ........................................................ 348/143
See application file for complete search history.

(56) References Cited

U.S. PATENT DOCUMENTS

| | | | | |
|---|---|---|---|---|
| 2004/0234109 | A1* | 11/2004 | Lemelson ............ | B60Q 1/0023 382/118 |
| 2007/0063840 | A1* | 3/2007 | Jentoft ............. | G08B 13/19641 340/541 |

(Continued)

*Primary Examiner* — Zaihan Jiang
(74) *Attorney, Agent, or Firm* — Christopher P. Maiorana, PC

(57) ABSTRACT

An apparatus comprising a camera sensor and a processor. The camera sensor may be configured to capture video data of an area of interest. The processor may be configured to (i) process the video data, (ii) generate control signals used to initiate security responses and (iii) execute computer readable instructions. The computer readable instructions are executed by the processor to (a) determine an activation state for the security responses, (b) determine a status of a visitor in the area of interest in response to an analysis of the video data, (c) select one of the control signals to initiate the security responses based on (i) the status of the visitor and (ii) the activation state and (d) determine a reaction of the visitor in response to the security responses.

19 Claims, 12 Drawing Sheets

Related U.S. Application Data now Pat. No. 9,542,832, said application No. 14/859,867 is a continuation of application No. 14/519,642, filed on Oct. 21, 2014, now Pat. No. 10,289,917, said application No. 14/859,867 is a continuation of application No. 14/504,632, filed on Oct. 2, 2014, now abandoned, and a continuation of application No. 14/664,275, filed on Mar. 20, 2014, now Pat. No. 9,726,338, application No. 15/593,570, filed on May 12, 2017, which is a continuation of application No. 15/246,818, filed on Aug. 25, 2016, now Pat. No. 9,728,077.

(60) Provisional application No. 62/335,827, filed on May 13, 2016, provisional application No. 61/790,865, filed on Mar. 15, 2013, provisional application No. 61/783,474, filed on Mar. 14, 2013, provisional application No. 61/684,310, filed on Aug. 17, 2012, provisional application No. 61/923,931, filed on Jan. 6, 2014, provisional application No. 61/783,565, filed on Mar. 14, 2013, provisional application No. 61/902,943, filed on Nov. 12, 2013, provisional application No. 62/166,968, filed on May 27, 2015, provisional application No. 62/197,322, filed on Jul. 27, 2015.

(56) References Cited

U.S. PATENT DOCUMENTS

| | | | |
|---|---|---|---|
| 2007/0066311 A1* | 3/2007 | Reibel | H04W 52/0261 455/445 |
| 2008/0300010 A1* | 12/2008 | Border | G06K 9/00228 455/556.1 |
| 2009/0149985 A1* | 6/2009 | Chirnomas | B65G 1/1373 700/215 |
| 2009/0179988 A1* | 7/2009 | Reibel | G08B 13/19 348/143 |
| 2011/0282697 A1* | 11/2011 | Fitzgerald | G06F 21/88 705/4 |
| 2012/0212582 A1* | 8/2012 | Deutsch | G08B 21/245 348/46 |
| 2013/0150686 A1* | 6/2013 | Fronterhouse | G06F 19/3418 600/323 |
| 2013/0223696 A1* | 8/2013 | Azar | G06K 9/00892 382/118 |
| 2013/0237272 A1* | 9/2013 | Prasad | H04B 7/0617 455/517 |
| 2014/0128032 A1* | 5/2014 | Muthukumar | H01Q 3/00 455/411 |
| 2014/0202800 A1* | 7/2014 | Breed | B60T 1/005 188/74 |

* cited by examiner

AUTOMATIC GREETINGS BY OUTDOOR IP SECURITY CAMERAS

This application relates to U.S. Provisional Application No. 62/335,827, filed May 13, 2016. This application also relates to U.S. Ser. No. 14/859,867, filed Sep. 21, 2015, which relates to U.S. Ser. No. 14/164,540, filed Jan. 27, 2014, now U.S. Pat. No. 9,143,741, which relates to U.S. Ser. No. 13/921,597, filed Jun. 19, 2013, now U.S. Pat. No. 9,172,917, which relates to (i) U.S. Provisional Application No. 61/790,865, filed Mar. 15, 2013, (ii) U.S. Provisional Application No. 61/783,474, filed Mar. 14, 2013, and (iii) U.S. Provisional Application No. 61/684,310, filed Aug. 17, 2012. U.S. Ser. No. 14/164,540, filed Jan. 27, 2014 also relates to U.S. Provisional Application No. 61/923,931, filed Jan. 6, 2014. U.S. Ser. No. 14/859,867, filed Sep. 21, 2015 also relates to U.S. Ser. No. 14/205,946, filed Mar. 12, 2014, now U.S. Pat. No. 9,542,832, which relates to U.S. Provisional Application No. 61/783,565, filed Mar. 14, 2013. U.S. Ser. No. 14/859,867, filed Sep. 21, 2015 also relates to U.S. Ser. No. 14/519,642, filed Oct. 21, 2014, which relates to U.S. Provisional Application No. 61/902,943, filed Nov. 12, 2013. U.S. Ser. No. 14/859,867, filed Sep. 21, 2015 also relates to U.S. Ser. No. 14/504,632, filed Oct. 2, 2014. U.S. Ser. No. 14/859,867, filed Sep. 21, 2015 also relates to U.S. application Ser. No. 14/664,275, filed Mar. 20, 2015. U.S. Ser. No. 14/859,867, filed Sep. 21, 2015 also relates to U.S. Provisional Application No. 62/166,968, filed May 27, 2015. U.S. Ser. No. 14/859,867, filed Sep. 21, 2015 also relates to U.S. Provisional Application No. 62/197,322, filed Jul. 27, 2015. This application also relates to U.S. Ser. No. 15/246,818, filed Aug. 25, 2016. Each of the mentioned applications are hereby incorporated by reference in their entirety.

FIELD OF THE INVENTION

The invention relates to security cameras generally and, more particularly, to a method and/or apparatus for implementing automatic greetings by outdoor IP security cameras.

BACKGROUND

Conventional smart home solutions provide an automatic notification to a smartphone when a visitor is detected at a home entrance. Sensors, such as Passive Infra-red (PIR), and computer vision can be used to detect a person or an animal within a field of view of a security camera. Upon receiving a notification, a user can turn on the smartphone, select a corresponding application, and connect to the outdoor smart home solution device to respond to the person at the entrance.

There are at least two problems with the conventional implementations. One problem is an inherent latency of the notification. Similar to a cell phone text message, notification latency can range from 1 second to over 10 minutes. Generally, the notification signal goes through the smart home solution device cloud server first, then to a smartphone proprietary server (i.e., Apple server for iPhones, Google server for Android phones, etc.) and then to the service provider carrier (i.e., a cellular service provider) to deliver the notification to the smartphone of the user. The quality of service (QoS) implemented by the Apple/Android server and/or service provider carrier is generally low. When servers are busy, the notifications can be delayed. Further delays to the user receiving the notification can be an amount of time for the user to connect the smartphone to the smart home solution device. Because of the delays, users may not be able to prevent bad events from happening at the home. The users may get a good recording of the bad events.

Another problem is that the number of notifications per day can be very high when there is a lot of events detected by the smart home solution. There may be traffic in the field of vision of the device or the environment (i.e., trees, wind, cloud shadows etc.) may cause the sensors to produce a lot of false alarms. Too many false notifications can lead to a "cry wolf" problem and actual bad events may be ignored by the user.

It would be desirable to implement automatic greetings by outdoor IP security cameras.

SUMMARY

The invention concerns an apparatus comprising a camera sensor and a processor. The camera sensor may be configured to capture video data of an area of interest. The processor may be configured to (i) process the video data, (ii) generate control signals used to initiate security responses and (iii) execute computer readable instructions. The computer readable instructions are executed by the processor to (a) determine an activation state for the security responses, (b) determine a status of a visitor in the area of interest in response to an analysis of the video data, (c) select one of the control signals to initiate the security responses based on (i) the status of the visitor and (ii) the activation state and (d) determine a reaction of the visitor in response to the security responses.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing automatic greetings by outdoor IP security cameras that may (i) reduce a number of false alarms, (ii) arm/disarm security responses based on a timing system, (iii) select security responses based on a type of visitor, (iv) monitor an area of interest, (v) implement machine learning to classify a type of visitor, (vi) integrate with third-party security services and/ or (vii) be implemented as one or more integrated circuits.

Embodiments of the invention may provide an automatic greeting from an IP security camera when the security IP camera detects a visitor. In an example, the security IP camera may be implemented as an outdoor security camera configured to detect a visitor at a door of a home. Embodiments of the invention may be implemented to monitor an area of interest to prevent bad events from happening at the home (e.g., a thief trying to steal a delivered package, a burglar looking for a house to break into, a solicitor disturbing a household, etc.). Embodiments of the invention may further provide a reduction of a number of alarms and/or notifications sent to a monitoring service (e.g., a third-party professional security service, volunteer-based security service, etc.).

Figure 1:
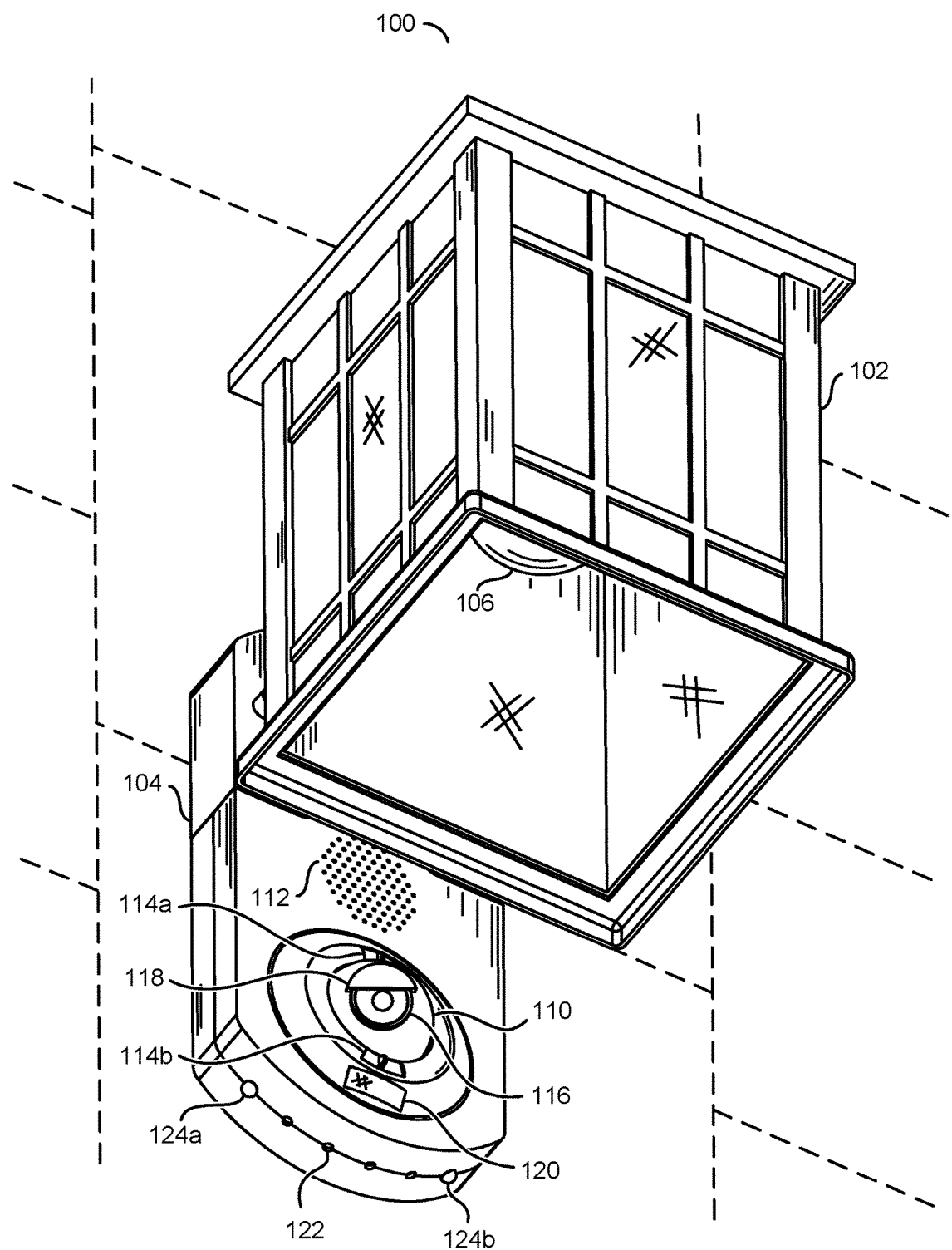
FIG. 1 is a diagram illustrating a security light implementing an embodiment of the present invention.

Referring to FIG. 1, a diagram illustrating a security light 100 implementing an embodiment of the present invention is shown. The security light 100 may be the smart security IP camera. The smart security light 100 may comprise a light shade 102 and the base 104. The base 104 may comprise a lens module 110, a speaker grille 112, adjustment grips 114a-114b, an IR sensor lens 120, a microphone grille 122, and indicator LEDs 124a-124b. The lens module 110 may comprise a lens 116 and a lens cover 118.

The smart security light 100 may further optionally comprise a light bulb 106. The light bulb 106 may be replaceable. The light bulb 106 may be implemented using an incandescent light bulb, a compact fluorescent lamp (CFL) bulb and/or an LED bulb. The type and/or style of the light bulb 106 may be varied according to the design criteria of a particular implementation.

The smart security light 100 may be implemented as a light fixture. The smart security light fixture 100 may be configured to mount to a wall and/or ceiling mount. The smart security light fixture 100 may be configured to connect to existing electrical wiring. For example, the smart security light fixture 100 may be mounted to an electrical box (e.g., a junction box) that provides wiring to the electrical system of a premises.

The lens module 110 may be configured to capture video data. For example, the lens module 110 may implement a high resolution and/or high definition (e.g., 720p, 1080i, 1080p, 4 k, etc.) video camera. The video data may be high-resolution video frames and/or audio data. The quality of the video data may be varied according to the design criteria of a particular implementation. Generally, the quality of the video data is enough to support object detection (e.g., facial recognition, motion detection, object identification, tagging, etc.).

Figure 2:
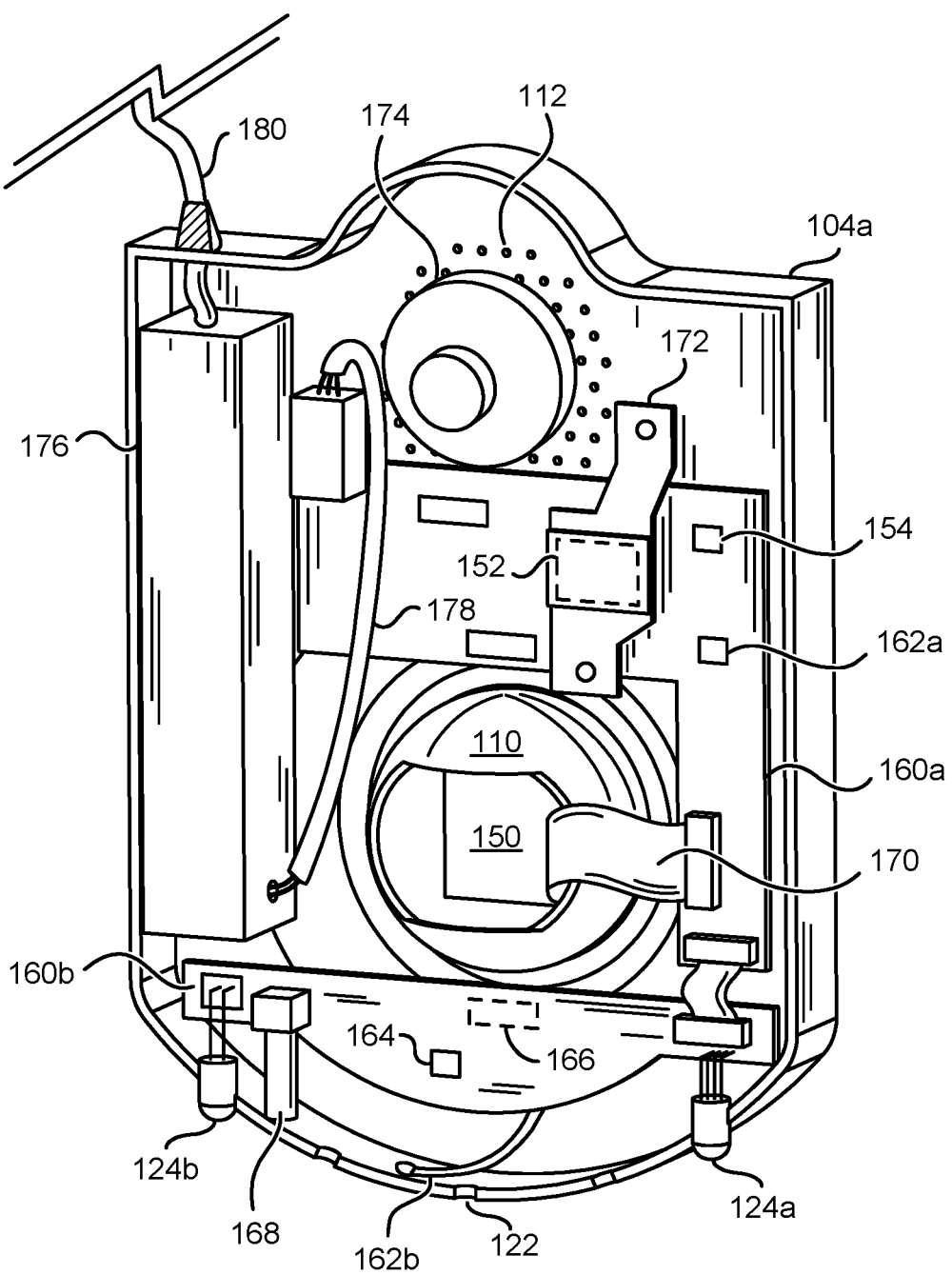
FIG. 2 is a diagram illustrating a rear view of the internal components of a security light implementing an embodiment of the present invention.

Referring to FIG. 2, a rear view of the internal components of the security light 100 implementing an embodiment of the present invention is shown. A backside of a front portion 104a of the base 104 is shown. A camera sensor 150 is shown in the lens module 110. A processor 152 is shown. Circuit boards 160a-160b are shown. In an example, the circuit board 160a may be a processor module. A memory 154 is shown on the circuit board 160a.

The circuit board 160a is shown as an L-shape (e.g., configured to fit around the lens module 110). The circuit board 160a is shown comprising the processor 152 and a communication module 162a. For example, the communication module 162a may be a Wi-Fi circuit. The communication module 162a may be connected to an antenna 162b. For example, the antenna 162b may be a flexible Wi-Fi antenna. The Wi-Fi antenna 162b may be held in place (e.g., glued) to a bottom of the base 104. The circuit board 160a may comprise other internal components of the light fixture 100. For example, the circuit board 160a may comprise a Bluetooth antenna (e.g., a Bluetooth antenna may be positioned on the other side of the circuit board 160a).

The circuit board 160b is shown connected to the circuit board 160a. The circuit board 160b is shown connected to a microphone 164, an IR sensor 166, the indicator LEDs 124a-124b and a reset button 168. The arrangement of the components and/or the type of components of the circuit board 160b may be varied according to the design criteria of a particular implementation.

The lens module 110 is shown having an opening. The opening may allow a cable 170 to connect the camera sensor 150 to the circuit board 160a. The cable 170 may be configured to transmit the video data captured by the camera sensor 150. For example, the cable 170 may be a high-speed, low-noise flexible cable. The circuit board 160a may transmit the video data from the cable 170 to the processor 152.

The processor 152 is shown under a heatsink 172. A speaker 174 is shown connected to the circuit board 160a. A power adapter 176 is shown connected to the processor module 160a. A cable 178 is shown connecting the power adapter 176 to the processor module 160a. The cable 178 may transmit supply power converted by the power adapter 176 to the processor module 160a (and the lens module 110). The cable 178 may transmit the control signals from the processor 152 to the power supply 176. For example, the cable 178 may transmit DC signals between the power supply 176 and the circuit boards 160a-160b. The power adapter 176 may convert the control signals from the processor 152 to be compatible with the light bulb 102 and/or other external devices such as security response devices. For example, the power adapter 176 may convert external power received from a cable 180 to provide power to the circuit boards 160a-160b via the cable 178. In another example, the power adapter 176 may convert signals received from the circuit boards 160a-160b via the cable 178 to provide power to external devices such as the security response devices via the cable 180.

The communication module 162 may be configured to connect to a local network and/or a wide area network (e.g., the internet). In some embodiments, the communication module 162 may be configured to implement one or more types of communications protocols. For example, the communication module 162 may support a Wi-Fi connection and/or a Bluetooth connection. In some embodiments, the communication module 162 may be distributed as multiple circuits on the circuit boards 160a-160b (e.g., a processing chip for each communications protocol). Other types of communications protocols may be implemented according to the design criteria of a particular implementation. In some embodiments, the communication module 162 may implement the Bluetooth connection to connect to a user device (e.g., a smartphone) to provide an interface for configuring the light fixture 100 (e.g., to allow the user to input local network settings). In some embodiments, the communication module 162 may implement the Wi-Fi connection to connect to a cloud service via the internet. In some embodiments, the communication module 162 may implement various types of short-range communication (e.g., Z-Wave, RFID, point-to-point communication, etc.).

In some embodiments, the smart light fixture 100 may be configured to upload data (e.g., the captured video data) to the cloud service. For example, the data uploaded to the cloud service may be streamed to the user device. The user device may connect to the cloud service to allow the user to request the stored video data. For example, the video data may be sent to the user device as a live (or nearly live) video stream. The data traffic to/from the cloud services may be encrypted (e.g., AES 128-bit encryption, AES 256-bit encryption, etc.). User account passwords may be salted and hashed with a cryptographic hash function.

In some embodiments, the smart security light fixture 100 may store the captured video data (e.g., in the memory 154). In some embodiments, the video data may be uploaded to the cloud service. Generally, the cloud service and/or the memory 154 may have a limited storage capacity. In some embodiments, the light fixture 100 may analyze the captured video data (e.g., using the processor 152) and/or data from the IR sensor 166 to perform a particular type of detection. For example, the light fixture 100 may detect objects, motion and/or visitors within in an area of interest. The smart security light fixture 100 may initiate storage of the video data in response to the particular type of detection. The detection performed by the smart security light fixture 100 may be used to detect objects approaching the premises.

Figure 3:
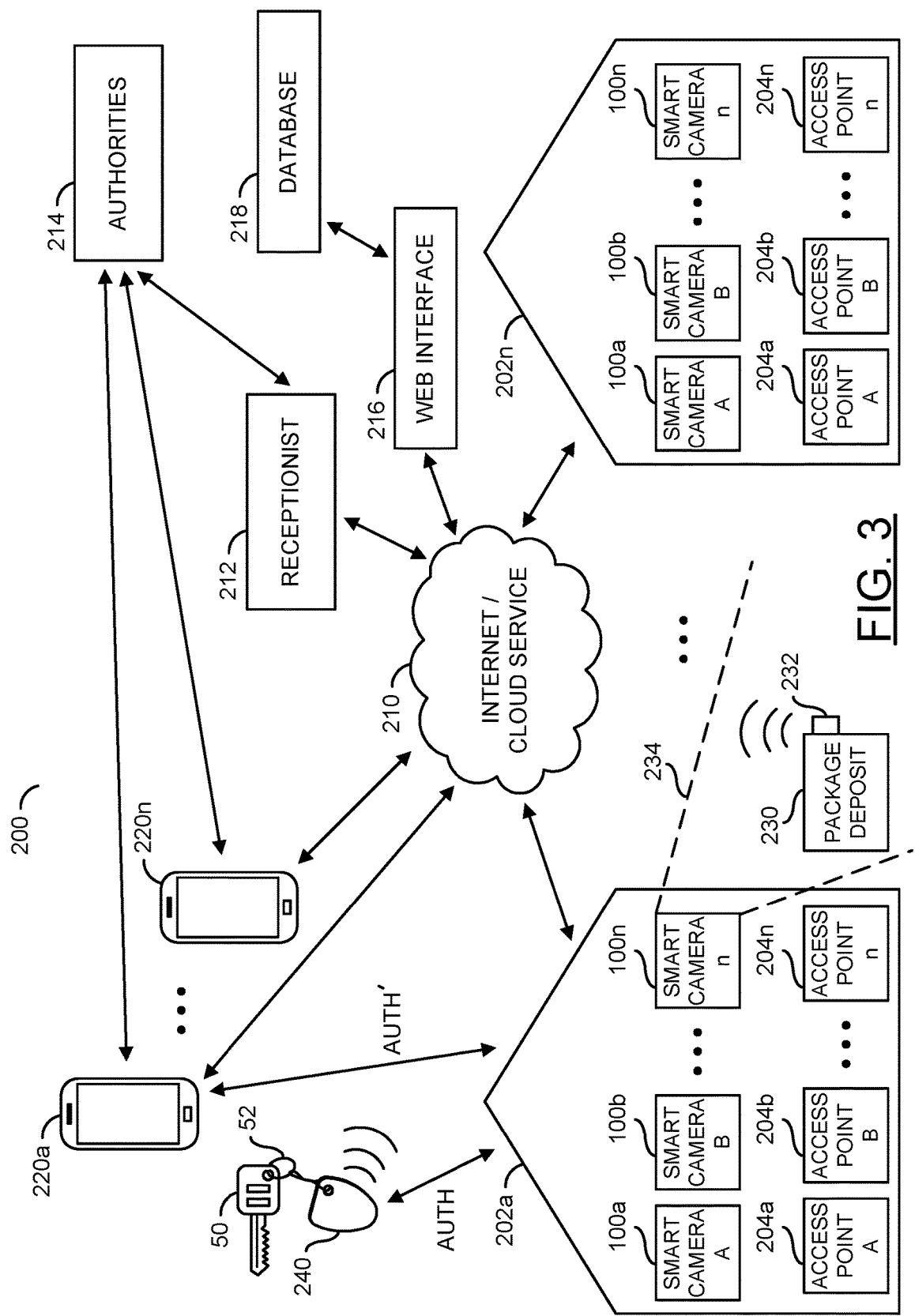
FIG. 3 is a diagram illustrating an example cloud-based security system.

Referring to FIG. 3, a diagram illustrating an example cloud-based security system 200 is shown. The system 200 generally comprises blocks 202a-202n. The blocks 202a-202n may be homes and/or business premises. Each of the homes 202a-202n may comprise blocks 204a-204n. The blocks 204a-204n may be areas of interest (e.g., access points to the homes and/or business premises 202a-202n). The smart security lights 100a-100n may be set up at each of the areas of interest 204a-204n of the homes and/or business premises 202a-202n. For example, the smart security lights 100a-100n may be configured to monitor the areas of interest 204a-204n.

The system 200 may further comprise the internet and/or cloud service 210, a receptionist 212, authorities 214, a web interface 216, a database 218 and/or blocks (or circuits) 220a-220n. The circuits 220a-220n may be the user devices. In an example, the user devices 220a-220n may be smartphones and/or other personal computing devices. In one example, the receptionist 212 may be a virtual receptionist. In another example, the receptionist 212 may be a person from a central monitoring service (e.g., a home security service). In one example, the authorities 214 may be the police department, the fire department, an ambulance, and/or other emergency services.

The areas of interest 204a-204n may be doors, windows, garages, other entrances, and/or vantage points. Generally, the smart cameras 100a-100n may be mounted at the areas of interest 204a-204n. Data from the smart cameras 100a-100n at the homes and/or business premises 202a-202n may be sent to the internet and/or cloud service 210.

Data sent to the internet and/or cloud service 210 may be sent to the user devices 220a-220n. For example, an alert from one of the smart cameras 100a-100n from the home 202a may be sent to the device 220a of the homeowner indicating that another family member has arrived home. In another example, an alert from one of the smart cameras 100a-100n from the home 202n may be sent to the smartphone 220c of an owner of another home (e.g., the owner of the home 202b) that a suspicious person has been identified in the neighborhood. A user may then send a notification to the authorities 214. A user of the user devices 220a-220n may send data back to the smart cameras 100a-100n of the homes and/or business premises 202a-202n through the internet and/or cloud service 210. In one example, a homeowner may send a command to arm an alarm (e.g., one of the security responses) at their home.

In one example, the user devices 220a-220n may be in the possession of trusted volunteers. The trusted volunteers may be other home owners in the system 200. The trusted volunteers may be the first line of response to a security issue detected by the system 200. Alerts by the system 200 may be sent in parallel to all the trusted volunteers. The trusted volunteers may use available communication channels provided such as cell phones, telephone and/or emails. The homeowner may advise particular pre-defined responses to particular alerts such as calling the authorities 214 (e.g., the police and/or the fire department). The trusted volunteers may be able to activate a set of pre-defined actions using the user devices 220a-220n. The trusted volunteers may take training sessions to learn how to properly respond to various alerts. The training sessions may be taken on-line. The on-line training sessions may be available on the web interface 216.

If the network of trusted neighbors 202a-202n has the same system, they may exchange images, video, and/or other information of unwelcomed visitors. The website and/or web interface 216 may have the database 218 to manage the images, video, and/or other information. Unwelcome visitors stored in the database 218 may be shared with other neighbors and/or the authorities 214 using the web interface 216. For example, when the unwelcomed visitors learn about the database 218 they may not target the neighborhood 202a-202n. Data in the database 218 may be used to classify types of visitors (e.g., comparisons may be performed between the captured video data and information in the database 218).

Multiple levels of alerts may be implemented to distinguish unwelcomed visitors from welcomed visitors (e.g., household members). Since most visitors may be welcomed, identifying strangers and raising the level of alert for immediate attention may be important. The technology to identify and/or classify welcomed visitors may include facial recognition, voice recognition, machine learning of habits (e.g., behaviors) and schedules of household members, and/or user inputs when errors occur. Learned behavior may be used to determine which pre-defined function to perform. For example, the learned behavior may determine that nobody is home at a particular time, and the pre-defined function may be to automatically arm the security system and/or perform energy saving functions (e.g., adjust the heating and/or cooling of a home). In another example, the daily schedule of inhabitants may be observed and/or recorded. The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. If nobody is home, the system 200 may determine that exterior lighting is needed and/or interior lighting is not needed. In another example, if a family is on vacation the system may turn on interior lighting to make it appear to a potential burglar that the home is occupied. The learned behavior may develop a unified status of the home (e.g., based on occupancy, time of day, weather, security status, etc.). Pre-defined functions may be performed based on the unified status of the home.

In some embodiments, the smart security light fixture 100 may initiate storage of the video data in response to motion detection in the area of interest. The user device 220a (e.g., a smart phone) may be used to allow a user to set a motion threshold for the smart security light fixture 100. For example, a lower motion threshold may be more sensitive to motion. In another example, a higher motion threshold may be less sensitive to motion (e.g., reduce a number of false positives). The motion threshold may be adjustable.

In some embodiments, the smart security light fixture 100 may initiate storage of the video data in response to detecting and/or locating a person (e.g., a visitor) and/or other type of object in the video data. In one example, the smart security light fixture 100 may analyze the video data to detect people and/or animals. In some embodiments, facial recognition may be implemented to classify and/or recognize visitors. The activation state may be selected based on the classification. In some embodiments, the video data may be analyzed to determine a behavior of the visitors.

In some embodiments, machine learning techniques may be implemented to improve detection and/or classification accuracy of visitors and/or objects. For example, the user may be able to provide a correct and/or incorrect label to a detection performed by the smart security light fixture 100. If the detection and/or classification is incorrect, the incorrect label may be used by the smart security light fixture 100 to incorporate an incorrect result of the detection into the machine learning techniques. In some embodiments, the machine learning techniques may be implemented in the cloud service (e.g., the analysis is performed using cloud computing resources). Video data and/or correct/incorrect labels may be uploaded and/or stored anonymously (e.g., without personal identification information). The smart security light fixture 100 may be configured to ignore (e.g., not respond to, not track and/or not send notifications in response to) small animals and/or shadows.

In some embodiments, the smart security light fixture 100 may be configured to send notifications to the user devices 220a-220n in response to the detection. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user may create a user account (e.g., comprising at least an email address and a password as credentials) for the cloud service (e.g., via an app and/or the web-based interface 216). The user account may allow the user to configure preferences. The preferences may comprise the notification settings. The type of notifications sent by the smart security light fixture 100 may be based on the notification settings. The smart security light 100 may implement the activation states and/or arm/disarm the security responses to limit a number of the notifications sent. Intelligently limiting the number of notifications sent may reduce a number of false alarms and/or reduce an amount of data transferred via the network 210 (e.g., prevent QoS issues and/or dropped data).

The cloud service 210 and/or the database 218 may store portions of the video data. For example, portions of the video data may be saved in response to the particular types of detections. The portions of video data may be video clips. The video clips may be encoded and/or compressed by the processor 152 to reduce a size of storage capacity of the video clips. The video clips may have a limited video length (e.g., 30 seconds, one minute, 90 seconds, five minutes, etc.). The length of the video clips may be based on the configuration preferences and/or in response to the detections by the light fixture 100 (e.g., a longer video clip may result in response to continuous detections). In some embodiments, the video clips may be pre-padded and/or post-padded with video data before and/or after the detection. For example, the video clip may store video data from a pre-determined time before and/or after the detection (e.g., 30 seconds before the detection and/or 30 seconds after the detection for a video clip approximately one minute long).

In some embodiments, a user interface may be provided for the user devices 220a-220n (e.g., an app, an executable program, the web-based interface 216, etc.). The user interface may allow one or more of the user devices 220a-220n to control various components of the light fixture 100. For example, one or more user devices 220a-220n may be configured to access the user account. The control signals may be generated in response to the input from the user devices 220a-220n. For example, an icon may be provided on the user interface representing a light bulb. The user may activate and/or deactivate the light bulb 102 by pressing (touching on a touchscreen, clicking, etc.) the icon.

Other components such as security response components may be turned on and/or off from the user interface. For example, icons may be provided to allow the user to control the speaker 174. In one example, the speaker 174 may playback a pre-recorded audio message (e.g., the user may select from one or more pre-recorded audio messages on the user interface to enable an automated message). In another example, the speaker 174 may sound an alarm (e.g., one or more alarm types may be selected from the user interface).

In some embodiments, the light fixture 100 may be configured for two-way audio communications (e.g., an intercom). For example, a visitor may speak through the microphone 164. The microphone 164 may receive the audio data. The communication module 162 may transmit the received audio to one or more of the user devices 220a-220n. The user devices 220a-220n may playback the audio to the user. The user may speak via the user devices 220a-220n. The user devices 220a-220n may transmit the audio to the light fixture 100 via the communication module 162 (e.g., a Wi-Fi connection). The speaker 174 may transmit and/or stream the received audio.

The light fixture 100 may provide various APIs (application programming interface) to connect with other devices (e.g., other home automation devices). For example, the APIs may allow various other devices to communicate with the light fixture 100. The light fixture 100 may generate control signals based on the communication with the various devices other devices. The types of APIs available may be varied according to the design criteria of a particular implementation.

A package deposit 230 is shown at the home 202a. The package deposit 230 may be implemented to allow the visitor to deliver packages. The package deposit 230 may be implemented as a container, a bag, a delivery slot, a mailbox, etc. In an example, the package deposit 230 may be implemented as a large net with a zipper and a lock. A delivery person may be instructed by the smart security light 100 to place a package inside the package deposit 230 and zip up and/or lock the package deposit 230. In some embodiments, the package deposit 230 may implement a hazardous waste storage (e.g., medical waste for a medical facility) and the package deposit 230 may be monitored to ensure proper disposal of materials in the package deposit 230 (e.g., the package deposit 230 may be implemented for package pick-up). The implementation of the package deposit 230 may be varied according to the design criteria of a particular implementation.

A wireless device 232 is shown on the package deposit 230. The wireless device 232 may be configured to transmit wireless signals to indicate a status of the package deposit 230. In an example, the wireless device 232 may send a notification to the security light 100 indicating that the package has been delivered. In another example, the wireless device 232 may be configured to send a notification to the security light 100 indicating that the package deposit 230 has been tampered with. The smart security light 100 may forward the notification to one or more of the user devices 220a-220n. The type of notifications transmitted by the wireless device 232 may be varied according to the design criteria of a particular implementation.

The smart security light 100 may be configured to adjust the activation state in response to the package being delivered and/or picked up (e.g., in response to the notification from the wireless device 232). A security zone 234 is shown. The smart security camera 100n may monitor the security zone 234 near the package deposit 230. In an example, when the security zone 234 is invaded (e.g., by a visitor such as a potential package thief) the smart security light 100 may be configured to perform a security response (e.g., activate an alarm, send an alert to a designated user, etc.). The security zone 234 may be the area of interest of the smart security light 100n. In some embodiments, the security zone 234 may correspond to the areas of interest 204a-204n.

A block (or circuit) 240 is shown. The circuit 240 may implement an identification device. For example, the identification device 240 may implement a wireless identification (ID). The wireless ID device 240 is shown connected to keys 50 and/or a keychain 52. Details of the wireless ID device 240 may be described in association with FIG. 4.

The communications module 162 may be configured to communicate with one or more of the smartphones 220a-220n and/or the wireless ID device 240 using a local connection (e.g., without connecting through the internet 210). The wireless ID device 240 is shown communicating with the smart security lights 100a-100n. In an example, the communication between the wireless ID device 240 and the smart security lights 100a-100n may be a Bluetooth Low-Energy (BLE) connection. The smartphone 220a is shown communicating with the smart security lights 100a-100n. The communication between the wireless ID device 240, the smartphones 220a-220n and/or the smart cameras 100a-100n may have a similar implementation as the wireless device 232.

In one example, the communication between the smartphone 220a and the smart security lights 100a-100n may be a geolocation signal (e.g., sent via Wi-Fi). The wireless ID device 240 may send/receive a signal (e.g., AUTH). The smartphone 220a may send/receive a signal (e.g., AUTH'). The signals AUTH and/or AUTH' may be an identification and/or authentication signal.

The smart security lights 100a-100n may be configured to prevent (e.g., disable) sending and/or generating notifications to a user, recording and/or transmitting video data and/or particular security responses based on the detection of the signal AUTH and/or the signal AUTH'. In some embodiments, based on the absence of the owner authenticated signal AUTH, one or more of the smart security lights 100a-100n may enable/disable various sensors and/or features (e.g., an image sensor and/or other input/output modules). In an example, one or more of the smart security lights 100a-100n may disable notifications when the signal AUTH is detected (e.g., the absence of the signal AUTH may enable notifications and/or video recording). In some embodiments, based on the owner authenticated signal AUTH', one or more of the smart security lights 100a-100n may disable various sensors and/or features (e.g., an image sensor and/or other input/output modules). In another example, a characteristic of the signal AUTH' detected by one or more of the smart security lights 100a-100n (e.g., a pre-determined threshold value) may disable notifications (e.g., when the signal AUTH' is a pre-determined distance away, notifications and/or video recording may be disabled). The signal AUTH' may provide a distance between one or more of the smart security lights 100a-100n and one or more of the smartphones 220a-220n. The response by the smart security lights 100a-100n in response to the signal AUTH and/or the signal AUTH' may be varied according to the design criteria of a particular implementation.

Figure 4:
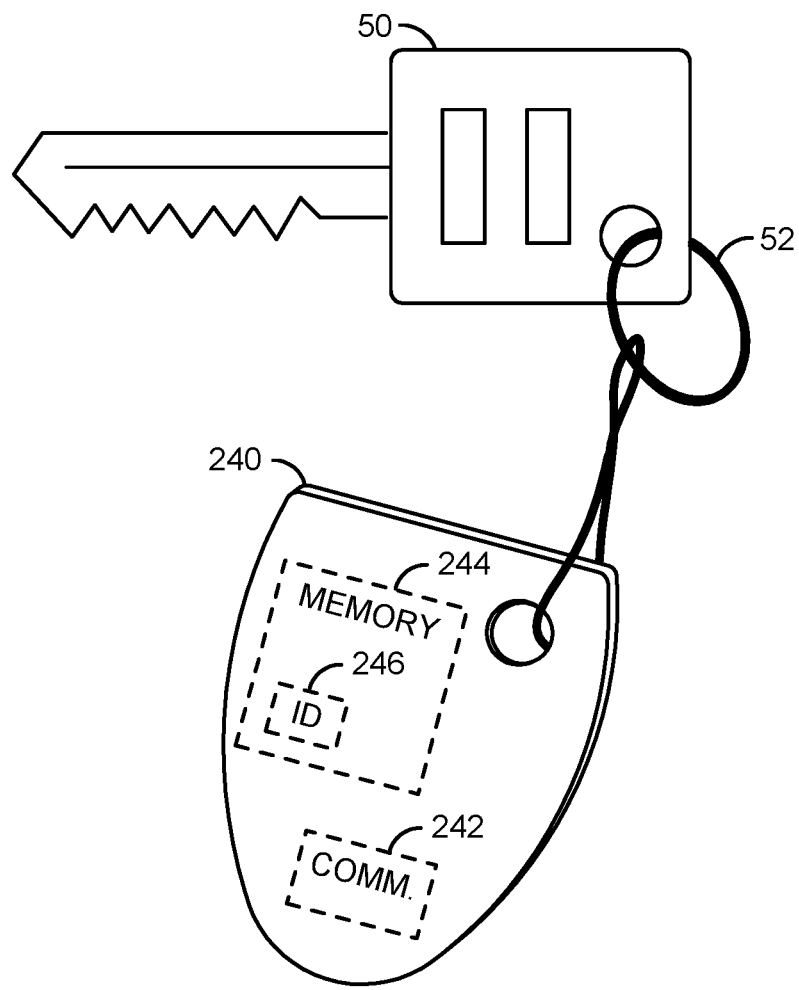
FIG. 4 is a diagram illustrating an identification device configured to communicate with a smart security light.

Referring to FIG. 4, a diagram illustrating an identification device 240 configured to communicate with one or more of the smart security lights 100a-100n is shown. The wireless ID device 240 is shown attached to the key 50 and the keychain 52. The wireless ID device 240 may generally be implemented as a small, portable object (e.g., something that may be carried by the user at all times). In an example, the wireless ID device 240 may be attached to a purse, a belt loop, a pocket, clothing, school bags, equipment bags, etc. Generally, the wireless ID device 240 may be connected to an item the user commonly leaves home with. The size, shape, color, and/or accessories used with the wireless ID device 240 may be varied according to the design criteria of a particular implementation.

The wireless ID device 240 may comprise a block (or circuit) 242 and/or a block (or circuit) 244. The circuit 242 may be a communication device. The circuit 244 may be a memory. The wireless ID device 240 may comprise other components (not shown). For example, the wireless ID device 240 may comprise a battery. The wireless ID device 240 may be a self-powered device. In another example, the wireless ID device 240 may optionally comprise a button (e.g., to initiate a pairing with one or more of the smart security lights 100a-100n). The components of the wireless ID device 240 may be varied according to the design criteria of a particular implementation.

The communication device 242 may be configured to communicate with one or more of the smart security lights 100a-100n. In some embodiments, the communication device 242 may be configured to communicate with the internet 210. The communication device 242 may implement a communications protocol configured to implement short-range, low-power, wireless communication. In one example, the communication protocol implemented by the communication device 242 may be a Bluetooth Low Energy (BLE) protocol (e.g., the signal AUTH may be a Bluetooth signal). In another example, the communication protocol implemented by the communication device 242 may be a Wi-Fi protocol. In yet another example, the communication protocol implemented by the communication device 242 may be a ZigBee protocol. Generally, the protocol implemented by the communication device 242 may be compatible with one or more of the communication protocols implemented by the communication module 162 of the smart security cameras 100a-100n. The communication protocol implemented by the communication device 242 may be varied according to the design criteria of a particular implementation.

The communication device 242 may be configured to generate the signal AUTH. The communication device 242 may be configured to receive data from one or more of the smart security lights 100a-100n. In an example, the smart security lights 100a-100n may be configured to communicate a device ID (e.g., a MAC address, a product identification number, an identification code stored in the database 218, etc.) to identify a particular one of the smart security lights 100a-100n and/or pair one or more of the smart security lights 100a-100n with the wireless ID device 240.

The memory 244 may store data. The memory 244 may comprise a block (or circuit or module) 246. The block 246 may be an ID block. The ID block 246 may store data corresponding to an identification of the user. In an example, the ID block 246 may be implemented to associate the user with the signal AUTH transmitted by the wireless ID device 240. The smart security lights 100a-100n may check the data from the ID block 246 to ensure that the user is a known visitor (or the homeowner). The data in the ID block 246 may associate a particular user with the authentication signal AUTH (e.g., the ID block 246 may enable an individualized authentication signal).

One or more of the smart security lights 100a-100n may be configured to check the data from the ID block 246 with data stored in the database 218 (or the memory 154 of the smart security lights 100a-100n). The database 218 (or the memory 154) may store identification information about the user (e.g., facial recognition data, relationship to the homeowner, behavioral patterns, movement patterns, etc.) and/or user preferences (e.g., notification settings, video data uploading settings, etc.). The data in the ID block 246 may be used by the smart security lights 100a-100n to associate the identification of the user with the corresponding data in the database 218 (or the memory 154). In an example, data from the ID block 246 may be a code word and/or a hash. The hash may be checked against the database 218 (or the memory 154) and the database 218 (or the memory 154) may store a greater amount of information.

Many different people (or pets) may have the wireless ID device 240 that may be recognized by the smart security lights 100a-100n. Each user may have different data in the ID block 246 to help the smart security lights 100a-100n distinguish between known visitors (e.g., expected visitors, friendly visitors and/or unfriendly visitors). In some embodiments, the database 218 (or the memory 154) may associate a different set of components of the smart security lights 100a-100n to enable/disable based on the different data stored in the ID block 246. In an example, the data in the ID block 246 may identify a person as the homeowner and the homeowner may have selected settings to prevent uploading the video data to the internet 210 when the homeowner is detected. In another example, the data in the ID block 246 may identify a person as the child of the homeowner and the homeowner may have selected settings to upload the video data of the child. In yet another example, the data in the ID block 246 may identify a person as a domestic worker and the homeowner may have selected settings to upload the video data and send a notification to the homeowner. In some embodiments, the data in the ID block 246 may be used to associate the user with a person on the 'whitelist' (e.g., a list of approved visitors) stored in the database 218.

In some embodiments, the smart security lights 100a-100n and/or the database 218 may group users based on the data in the ID block 246. The smart security lights 100a-100n may be configured to enable/disable components the same way for each user in the group. In an example, one group may be 'friends' and when any wireless ID device 240 that corresponds to the users in the 'friends' group is detected by one of the smart security lights 100a-100n then a pre-recorded audio message may be played. In another example, one group may be 'domestic workers', and when any wireless ID device 240 that corresponds to the users in the 'domestic workers' group is detected by one of the smart security lights 100a-100n then a notification may be sent to the homeowner. Some users may be associated with more than one group. Generally, the combination of the components of the smart security lights 100a-100n that may be enabled/disabled by the signal AUTH may be assigned to each user and/or user group. The number of groups and the responses by the smart security lights 100a-100n to the groups may be varied according to the design criteria of a particular implementation.

Each user may receive one or more notifications based on the settings selected, the schedule and/or based on the data from the ID block 246. For example, the notification may be sent to one of the user devices 220a-220n. In one example, the notification may be that a family member has arrived home. In another example, the notification may be that a package has been delivered. In a further example, the notification may be that authorities 214 have been alerted due to a burglar on the premises. The particular notification may be varied to meet the design criteria of a particular implementation. Each user may set up a particular notification type corresponding to the scale of urgency. Set up of notifications may be implemented through the web interface 216 and/or an app implemented for the user devices 220a-220n.

Figure 5:
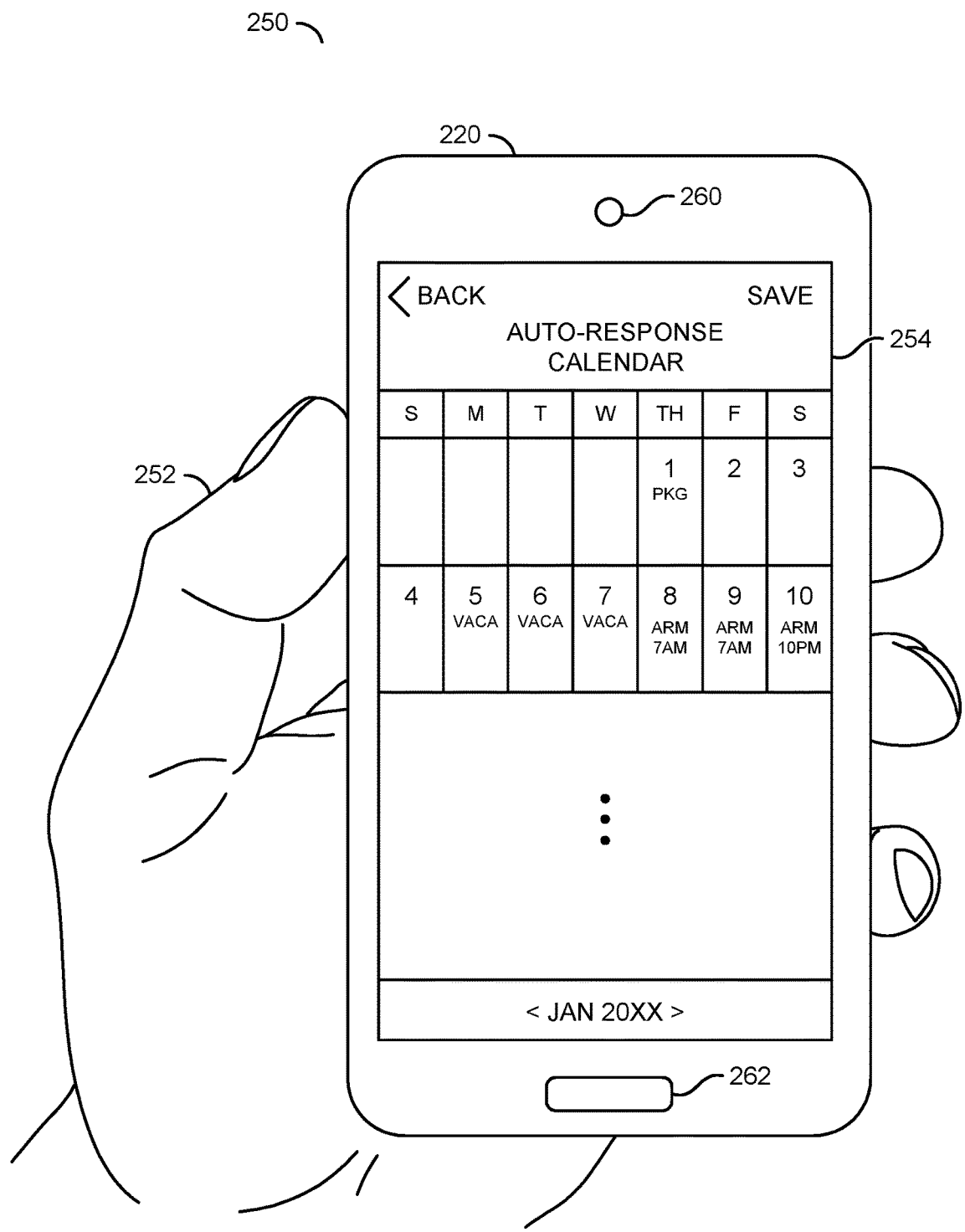
FIG. 5 is a diagram illustrating an example smartphone timing system input.

Referring to FIG. 5, a diagram illustrating an example smartphone timing system input 250 is shown. The user 252 is shown holding the smartphone 220. A display interface 254 is shown on the smartphone 220. The smartphone 220 is shown comprising a speaker 260 and a microphone 262 (e.g., implemented to receive notifications and/or provide 2-way communication with the smart security light 100). The display interface 254 may be a timing input for the smart security light. In an example, the timing input 254 may implement a user-configurable calendar for adjusting the timing system.

In some embodiments, the user interface 254 may be used to input a timing schedule. The timing schedule may control the activation state of the smart security light 100 and/or one or more of the security responses. The control signals may be generated in response to the schedule. For example, the schedule may indicate times and/or dates to activate and/or deactivate the light bulb 106 (e.g., a dusk-to-dawn mode). In some embodiments, the control signals may be generated in response to the schedule and a random value. For example, the schedule may be configured to turn on the light bulb 106 at 7 pm, and the random value may add or subtract a maximum value of 5 minutes to the scheduled time to allow the light bulb 106 to be activated at any time between 7:55 pm and 8:05 pm. The random value may be implemented to provide the appearance that the light bulb 106 is being controlled by a person instead of a schedule. The schedule may be customizable via the user interface 254 (e.g., different patterns on weekdays and weekends).

The smart security light 100 may automatically arm/disarm "automatic greetings" (e.g., one of the security responses). The security responses that are armed may be dependent on a particular activation state (e.g., at work, on vacation, sleeping, etc.). In an example, the calendar-based tool 254 may be used to determine when the "automatic greetings" feature should be turned on (e.g., armed) or turned off (e.g., disarmed). In an example, during a high traffic and/or low risk time, the security responses may be turned off. In another example, the security responses may be armed during vacation, at night, and/or during work hours when no one is expected to be home.

The calendar interface 254 is shown displaying days of a month. In the example shown, on the 1st of the example month displayed, a package may be expected (e.g., the security responses of the security light 100 may be armed for a package delivery). In the example shown, from the 5th to the 7th of the example month displayed, the user 252 may be on vacation (e.g., security responses corresponding to a vacation status may be armed). In the example shown, on the 8th and 9th of the example month displayed, the smart security light 100 may be armed starting when the user 252 leaves for work (e.g., 7 AM). In the example shown, on the 9th of the example month displayed, the security light 100 may be armed starting when the user 252 is expected to go out for the night (e.g., 10 PM). The types of security responses and the activation states may be varied according to the design criteria of a particular implementation.

The smart security light 100 may implement automatic greetings as one of the security responses to minimize an annoyance to "friendly visitors" and/or prevent excessive notifications being sent to the user 252. The smart security light 100 may provide an effective deterrence to "unfriendly visitors". The smart security light 100 may implement various features to reduce an annoyance and/or improve benefits associated with the security responses (e.g., the automatic greetings).

In some embodiments, the smart security light 100 may implement one or more sensors and/or implement machine learning to turn off the security responses when "friendly visitors" are detected. In an example, the "friendly visitors" may be people who frequently enter the home (e.g., family members, domestic helpers, close friends, pre-approved visitors, etc.). In one example, the sensors may comprise the IR sensor 166. In some embodiments, the processor 152 may be configured to implement the machine learning and/or perform the video analysis for distinguishing different types of visitors. In some embodiments, the processor 152 may be configured to send (via the communications module 162a-162b) captured video data to the cloud services 210 and the cloud services 210 may perform the machine learning and/or the video analysis for distinguishing different types of visitors (e.g., the computer executable instructions implemented by the processor 152 may have an API for receiving data from the cloud services 210). In some embodiments, the machine learning and/or video analysis for distinguishing different types of visitors may be implemented by a combination of the cloud services 210 and the processor 152. The implementation of the machine learning and/or the video analysis for distinguishing different types of visitors may be varied according to the design criteria of a particular implementation The smart security light 100 may be configured to perform a classification (e.g., distinguish various types of the visitors). For example, the smart security light 100 may implement computer vision, PIR sensors, machine learning, detection of wireless ID signals (e.g., from a smartphone, from RFID devices, from smart tags, from Bluetooth signals, etc.) and/or to classify the visitors. In some embodiments, the visitors may be classified as potential burglars trying to find out if anyone is home, delivery people, solicitors, package thieves, residents (e.g., recognized by the wireless ID signals), domestic helpers (e.g., recognized by the wireless ID signals), emergency responders, neighbors etc. The number and/or types of classifications may be varied according to the design criteria of a particular implementation.

In some embodiments, video data captured by the smart security cameras 100a-100n may be analyzed to determine a behavior and/or identity of a visitor. Based on the video analysis (e.g., facial recognition, object detection, object classification, etc.) and/or behavioral analysis, the smart security cameras 100a-100n may determine whether a visitor is a friendly visitor (e.g., a known, a welcome and/or whitelisted visitor) and/or an unfriendly visitor (e.g., an unknown, an undesired and/or blacklisted visitor). For example, each video frame may be analyzed and/or compared to templates (or feature maps) to identify, classify and/or recognize objects. For example, video data in the video frames may be compared to templates of known objects to classify portions of captured video frames as a particular type of object. In an example, facial recognition may be implemented to compare an object classified as a face of a person with stored data corresponding to previously stored faces. In some embodiments, the facial recognition may be performed locally by the smart security cameras 100a-100n. In some embodiments, video may be uploaded to the internet/cloud services 210 to enable distributed computing resources to perform facial recognition.

In some embodiments, the smart security cameras 100a-100n may combine multiple sensory signals to accurately characterize the behavior of a visitor. Characterization of the behavior of the visitor may be performed and/or presented to home/business owners in real time. For example, categorizations of the behavior of visitors may comprise the behavior typical of potential burglars, solicitors, delivery workers, residents, domestic helpers, strangers, friendly visitors with and/or without access to the premises, etc. The number and/or type of behavior categorizations may be varied according to the design criteria of a particular implementation.

Different types of behavior by a visitor may have a different impact on the type of visitor classification. For example, a visitor touching the doorknob may result in a small increase to an urgency level. In another example, a visitor detected at two different access points of the premises may result in a large increase to the urgency level (e.g., checking multiple entrances may indicate a burglar is trying to enter the premises). Notifications may be sent and/or other event responses may be initiated based on the urgency level. Heuristics may be used and/or assumptions may be made when monitoring behavior of a visitor. For example, if the visitor stays at the access point (e.g., the front door) for more than 10 seconds an assumption may be made that the visitor has rung the doorbell and/or knocked on the door. The heuristics used and/or the assumptions made may be used to adjust the urgency level.

The smart security light 100 may implement customized pre-recorded messages. In an example, the memory 154 may store the pre-recorded messages. In another example, the communications module 154 may stream pre-recorded messages (e.g., from the smartphone 220 and/or the cloud service 210). The speaker 174 may play the pre-recorded messages. The pre-recorded messages may be one of the security responses.

The user 252 may select from several choices of pre-recorded messages for each type of visitor. The deterrence effect may be one or more of "nothing", a comment in a "nice tone" and "several minutes of loud sirens" (e.g., an alarm). One example of a deterrence message for a potential burglar may be: "Hi Mary and Paul are busy. Please speak and leave a message with your phone number, you are being recorded by a monitoring service. Bye bye". After the security response is performed, the smart security light 100 may monitor a reaction (e.g., a behavior) of the visitor to the security response. In an example, if the visitor is still in the area of interest after 40 seconds an additional security response may be performed (e.g., sound siren for 20 seconds). In another example, a message for a package delivery person may be: "Please leave the package at the right corner in front of the door for the camera to see. If you need a signature, please ring the doorbell and I will be right there. Thanks". The type and/or content of the pre-recorded messages may be varied according to the design criteria of a particular implementation.

In some embodiments, the smart security light 100 may implement security responses and/or deterrents against package thieves. In an example, the storage bag 230 may be implemented for the delivered packages and the smart security light 100 may use the pre-recorded message to ask the delivery person to put the packages inside the storage bag 230. The storage bag 230 may be secured by bolting the storage bag 230 to the wall and/or tied to the door of the home 202a. Once the bag 230 is closed and/or locked, a wireless signal from the wireless device 232 may be sent to the smart security light 100 and put the smart security light 100 in a "packages delivered alert state".

One of the security responses may be activating an automatic alarm signal (e.g., a notification) when the visitor is still detected after the pre-recorded messages is completed. The user 252 may have the automatic alarm signal notification sent to one or more designated people (e.g., a notification sent to one or more of the smartphones 220a-220n). In an example, the notification may be sent to a professional monitoring service, the user 252 and/or a volunteer who may engage with the visitor (e.g., a neighbor, the authorities 214, etc.).

The user 252 may set up an option to automatically receive visitors at the door. In one example, the smart security light 100 may be configured to deter a potential burglar who is looking for an easy target home with no one inside the house 202. When the smart security light 100 classifies the visitor as a potential burglar the speaker 174 may announce "Hi Mary and Paul are busy. Please speak and leave a message with your phone number, you are being recorded by a monitoring service. Bye bye." (e.g., play the pre-recorded security response). If the visitor is still detected after a pre-determined amount of time (e.g., 40 seconds), the additional security response may be activated (e.g., activating a siren for 20 seconds). If the visitor is still there after the siren, an automatic alarm signal may be sent (e.g., the notification security response) to a designated person to engage with the visitor (e.g., the authorities 214).

In another example, the smart security light 100 may be configured to deter a potential package thief who sees a package at the door front of a house 202. When the smart security light 100 classifies the visitor as a potential burglar the smart security light 100 may enter a "packages delivered alert state". In the "packages delivered alert state", for anyone detected by the smart security light 100 as approaching the door (e.g., the zone 234), a pre-recorded message may be played (e.g., "Do not touch the packages, you are being recorded. We will find you. A loud siren will start in 10 seconds"). If the visitor is still in the zone 234, the smart security light 100 may send an automatic alarm signal (e.g., the notification security response) to one or more of the designated people to engage with this visitor.

The smart security light 100 may prevent two common types of crimes (e.g., package thefts and home burglaries). Because these two crimes are not considered serious (or urgent) and happen millions of times every year, the police force cannot afford to deal with them. Implementing the security light 100 may prevent billions of dollars of property thefts when widely deployed (e.g., to over 20% of households). The smart security light 100 further provides peace of mind to homeowners.

In some embodiments, the smart security lights 100a-100n may be activated in response to a visitor detected at another one of the houses 202a-202n. In an example, the smart security lights 100a-100n of one of the homes 202a-202n may provide a better view of a visitor and/or an additional angle to provide more information to the authorities 214 (e.g., a thief may be recorded escaping the scene of a crime and running through a number of the backyards of the homes 202a-202n). For example, the smart security lights 100a-100n installed at the multiple homes 202a-202n may implement a smart neighborhood watch.

In some embodiments, the video analysis may detect particular visitors and/or characteristics of the visitors and the smart security light 100 may respond (e.g., enter a particular activation state, over-ride an activation state and/or arm/disarm one or more of the security responses). In an example, if a weapon (e.g., a gun, a knife, a bat, etc.) is detected, the notification security response may be activated regardless of the activation state of the smart security light 100. In another example, if fire is detected, the authorities 214 may be alerted (e.g., the fire department). In yet another example, if blood is detected, the authorities 214 may be alerted (e.g., the police and/or an ambulance). In still another example, if a particular type of uniform and/or ID (e.g., a police badge) is detected, the user 252 may receive the notification security response.

In some embodiments, the wireless ID device 240 (or one of the smartphones 220a-220n) may be configured to implement an override for the schedule. The signal AUTH (or AUTH') may be configured as a manual override for the schedule. The smart security devices 100a-100n may be configured to be armed (or disarmed) based on the schedule. When one or more of the smart security devices 100a-100n detect the wireless ID device 240, the preferences (e.g., the security responses armed and/or disarmed) of the user associated with the ID block 246 detected may be used instead of the preferences set according to the schedule. When the wireless ID device 240 is no longer detected, the smart security devices 100a-100n may revert back to the preferences set according to the schedule. The wireless ID device 240 may implement a temporary change in security responses for the smart security devices 100a-100n.

In the example shown, on the 5th to the 6th of the example month displayed, the schedule may implement vacation security response settings (e.g., high alert for burglars). If a visitor approaches the premises 202 during the vacation security response settings, the security response may comprise a request to leave, a stern request to leave, an alarm and bright flashing light and then a call to the authorities 214. The homeowner on vacation may approve a visitor to enter the premises 202 while on vacation (e.g., a family member or neighbor may be asked to check on and feed a pet, or check the mail, etc.). The visitor may have the wireless ID device 240. When the wireless ID device 240 is detected (e.g., the signal AUTH is detected), the smart security lights 100a-100n may check the ID block 246 and determine the visitor is a friendly visitor. The security response preferences for the visitor with the wireless ID device 240 may be settings for a pre-approved guest. For example, since the guest is a friendly visitor permitted in the home to feed a pet, smart security lights 100a-100n may unlock one or more of the access points 204a-204n to enable entry into the premises 202 (e.g., the homeowner may not need to lend a key or hide a key on the property to allow entrance). Since the visitor is a guest entering an unoccupied home, the smart security lights 100a-100n may be configured to record video of the visitor (e.g., to prevent theft). When the visitor leaves the premises 202 and the signal AUTH is no longer detected by the smart security cameras 100a-100n, the smart security cameras 100a-100n may revert back to the vacation security response settings.

Figure 6:
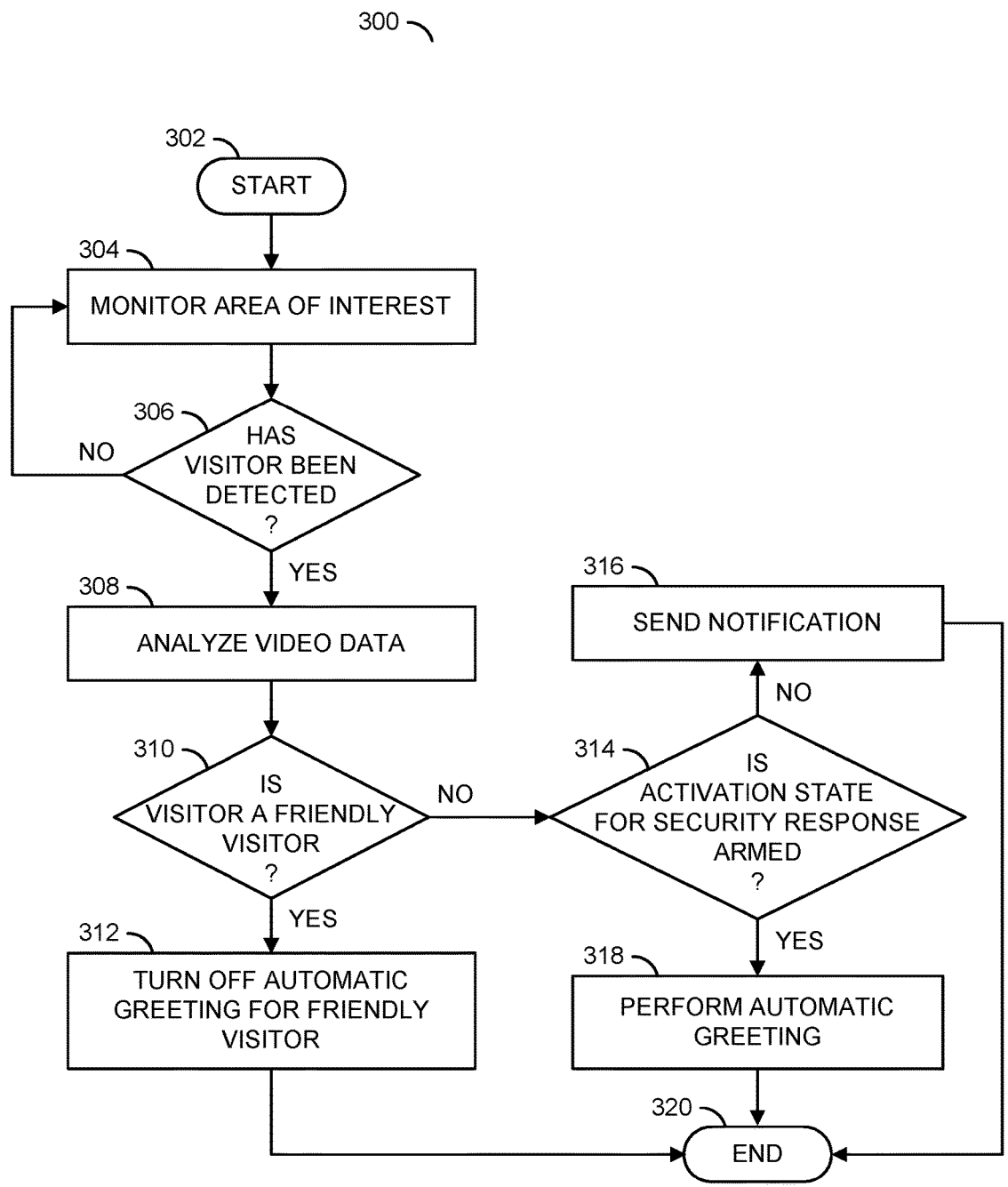
FIG. 6 is a flow diagram illustrating a method for performing an automatic greeting based on video analysis of a visitor.

Referring to FIG. 6, a method (or process) 300 is shown. The method 300 may perform an automatic greeting based on video analysis of a visitor. The method 300 generally comprises a step (or state) 302, a step (or state) 304, a decision step (or state) 306, a step (or state) 308, a decision step (or state) 310, a step (or state) 312, a decision step (or state) 314, a step (or state) 316, a step (or state) 318, and a step (or state) 320.

The state 302 may start the method 300. In the state 304, the smart security lights 100a-100n may monitor the area of interest. Next, the method 300 may move to the decision state 306. In the decision state 306, the smart security lights 100a-100n may determine whether a visitor has been detected (e.g., based on video analysis, based on detection by the PIR sensor 120, based on detection of the wireless ID device 240, etc.). If the visitor has not been detected, the method 300 may return to the state 304. If the visitor has been detected, the method 300 may move to the state 308.

In the state 308, the processor 152 may analyze the video data (e.g., perform video analysis, classify objects, detect behavior, recognize objects, etc.). In some embodiments the processor 152 may detect the ID block 246 of the wireless ID device 240 in addition to and/or instead of video analysis. Next, the method 300 may move to the decision state 310. In the decision state 310, the processor 152 may determine whether the visitor is a friendly visitor. If the visitor is not friendly, the method 300 may move to the decision state 314. If the visitor is friendly, the method 300 may move to the state 312. In the state 312, the processor 152 may turn off automatic greetings for the friendly visitor (e.g., the security response may be to allow the visitor entry to the premises 202 without notifying the homeowner to prevent annoyance). Next, the method 300 may move to the state 320.

In the decision state 314, the processor 152 may determine whether the activation state for the security response is armed. For example, the activation state for the security response may be determined based on the schedule and/or the user preferences. If the activation state for the security responses is not armed, the method 300 may move to the state 316. In the state 316, the processor 152 may cause the communication module 162 to send a notification (e.g., a text message, an email, a native notification for the operating system, an app notification, etc.) to the homeowner on one or more of the user devices 220a-220n. Next, the method 300 may move to the state 320.

In the decision state 314, if the activation state for the security responses is armed, the method 300 may move to the state 318. In the state 318, the processor 152 may cause the various components of the smart security camera 100 to perform the automatic greeting. For example, the speaker 174 may playback a recording of the greeting. Next, the method 300 may move to the state 320. The state 320 may end the method 300.

Figure 7:
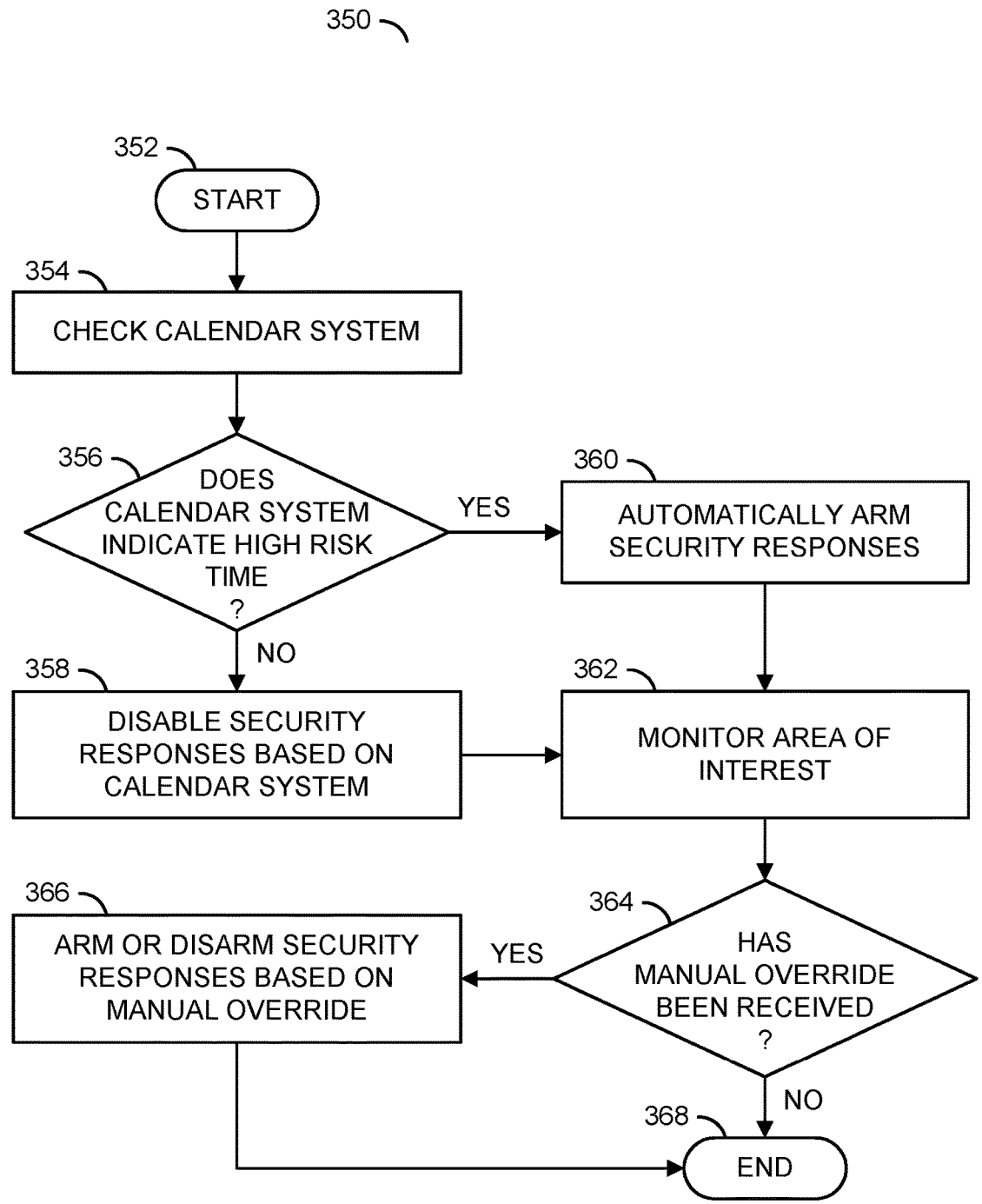
FIG. 7 is a flow diagram illustrating a method for arming/disarming security responses based on a timing system.

Referring to FIG. 7, a method (or process) 350 is shown. The method 350 may arm/disarm security responses based on a timing system. The method 350 generally comprises a step (or state) 352, a step (or state) 354, a decision step (or state) 356, a step (or state) 358, a step (or state) 360, a step (or state) 362, a decision step (or state) 364, a step (or state) 366, and a step (or state) 368.

The state 352 may start the method 350. In the state 354, the processor 152 may check the calendar system (e.g., the schedule). Next, the method 350 may move to the decision state 356. In the decision state 356, the processor 152 may determine whether the calendar system indicates a high risk time. For example, when the schedule is set to a vacation setting and/or an out of the home setting, the calendar system may indicate a high risk time. If the calendar system does not indicate a high risk time, the method 350 may move to the state 358. In the state 358, the processor 152 may disable the security responses for the smart security camera 100 based on the status of the schedule. Next, the method 350 may move to the state 362. In the decision state 356, if the calendar system does indicate a high risk time, the method 350 may move to the state 360. In the state 360, the processor 156 may automatically arm the security responses based on the schedule settings. Next, the method 300 may move to the state 362.

In the state 362, the smart security camera 100 may monitor the area of interest. Next, the method 350 may move to the decision state 364. In the decision state 364, the processor 152 may determine whether the manual override has been received (e.g., whether the signal AUTH and/or AUTH' has been detected). If the manual override has been received, the method 350 may move to the state 366. In the state 366, the processor 152 may arm and/or disarm security responses of the smart security light 100 based on the manual override (e.g., the user ID of the ID block 246). Next, the method 350 may move to the state 368. In the decision state 364, if the manual override has not been received, the method 350 may move to the state 368. The state 368 may end the method 350.

Figure 8:
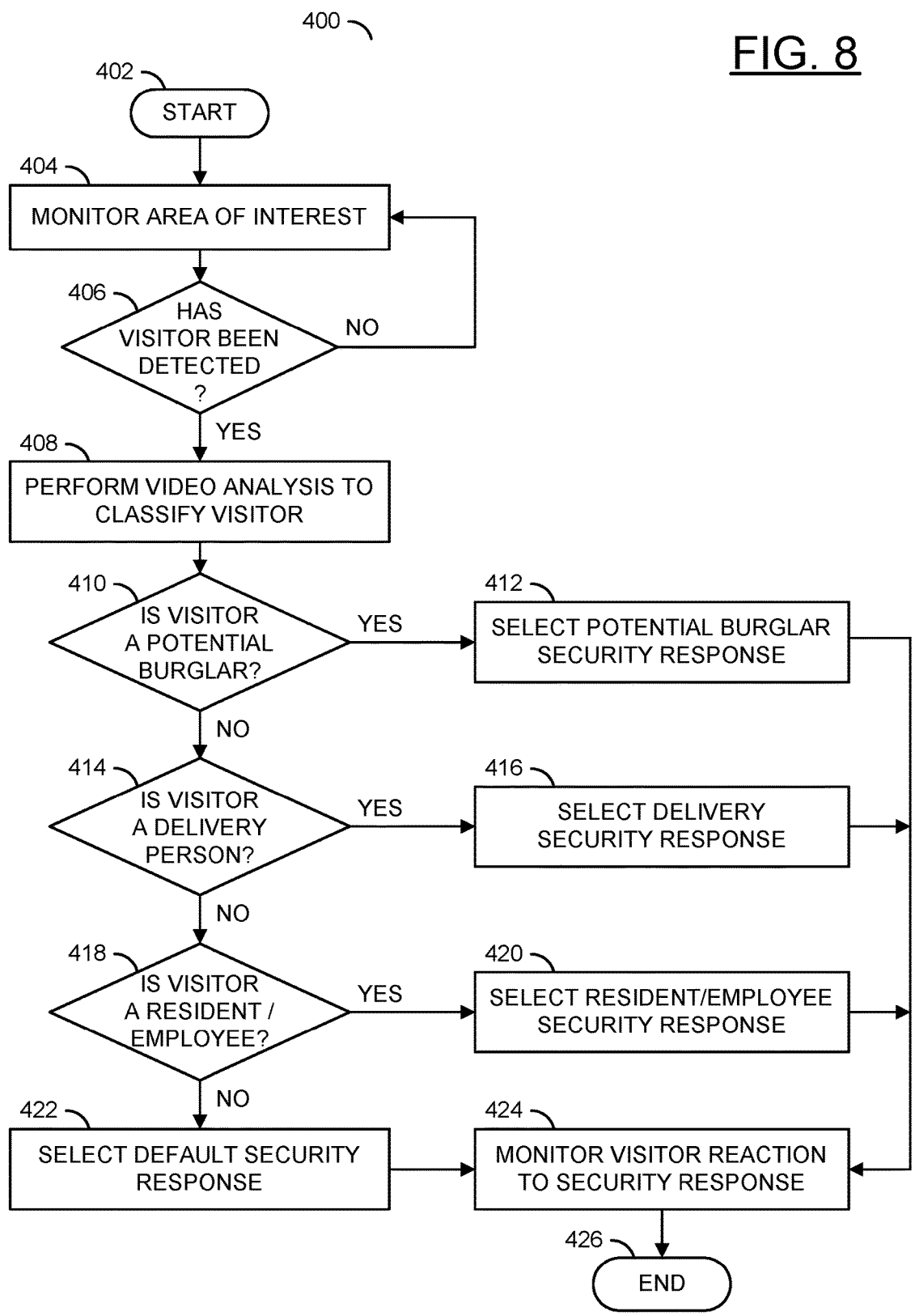
FIG. 8 is a flow diagram illustrating a method for selecting security responses based on a type of visitor.

Referring to FIG. 8, a method (or process) 400 is shown. The method 400 may select security responses based on a type of visitor. The method 400 generally comprises a step (or state) 402, a step (or state) 404, a decision step (or state) 406, a step (or state) 408, a decision step (or state) 410, a step (or state) 412, a decision step (or state) 414, a step (or state) 416, a decision step (or state) 418, a step (or state) 420, a step (or state) 422, a step (or state) 424, and a step (or state) 426.

The state 402 may start the method 400. In the state 404, the smart security camera 100 may monitor the area of interest. Next, the method 400 may move to the decision state 406. In the decision state 406, the processor 152 may determine whether a visitor has been detected. If a visitor has not been detected, the method 400 may return to the state 404. If the visitor has been detected, the method 400 may move to the state 408. In the state 408, the processor 152 may perform video analysis to classify the visitor. For example, facial recognition and/or behavior analysis may be performed by the processor 152. In another example, video data may be uploaded to a distributed computing resource (e.g., an external service such as the cloud services 210) to perform facial recognition and/or behavior analysis and the processor 152 may accept the data from the external service. Next, the method 400 may move to the decision state 410.

In the decision state 410, the processor 152 may determine whether the visitor is a potential burglar. If the visitor is determined to be a potential burglar, the method 400 may move to the state 412. In the state 412, the processor 152 may select the potential burglar security responses. Next, the method 400 may move to the state 424. If the visitor is determined to not be a potential burglar, the method 400 may move to the decision state 414.

In the decision state 414, the processor 152 may determine whether the visitor is a delivery person. If the visitor is determined to be a delivery person, the method 400 may move to the state 416. In the state 416, the processor 152 may select the delivery person security responses. Next, the method 400 may move to the state 424. If the visitor is determined to not be a delivery person, the method 400 may move to the decision state 418.

In the decision state 418, the processor 152 may determine whether the visitor is a resident/employee. If the visitor is determined to be a resident/employee, the method 400 may move to the state 420. In the state 420, the processor 152 may select the resident/employee security responses. Next, the method 400 may move to the state 424. If the visitor is determined to not be a resident/employee, the method 400 may move to the state 422.

In the state 422 the processor 152 may select the default security responses (or the security responses determined based on the schedule). Next, the method 400 may move to the state 424. In the state 424, the smart security light 100 may monitor the visitor reaction to the security responses. Next, the method 400 may move to the state 426. The state 426 may end the method 400.

Figure 9:
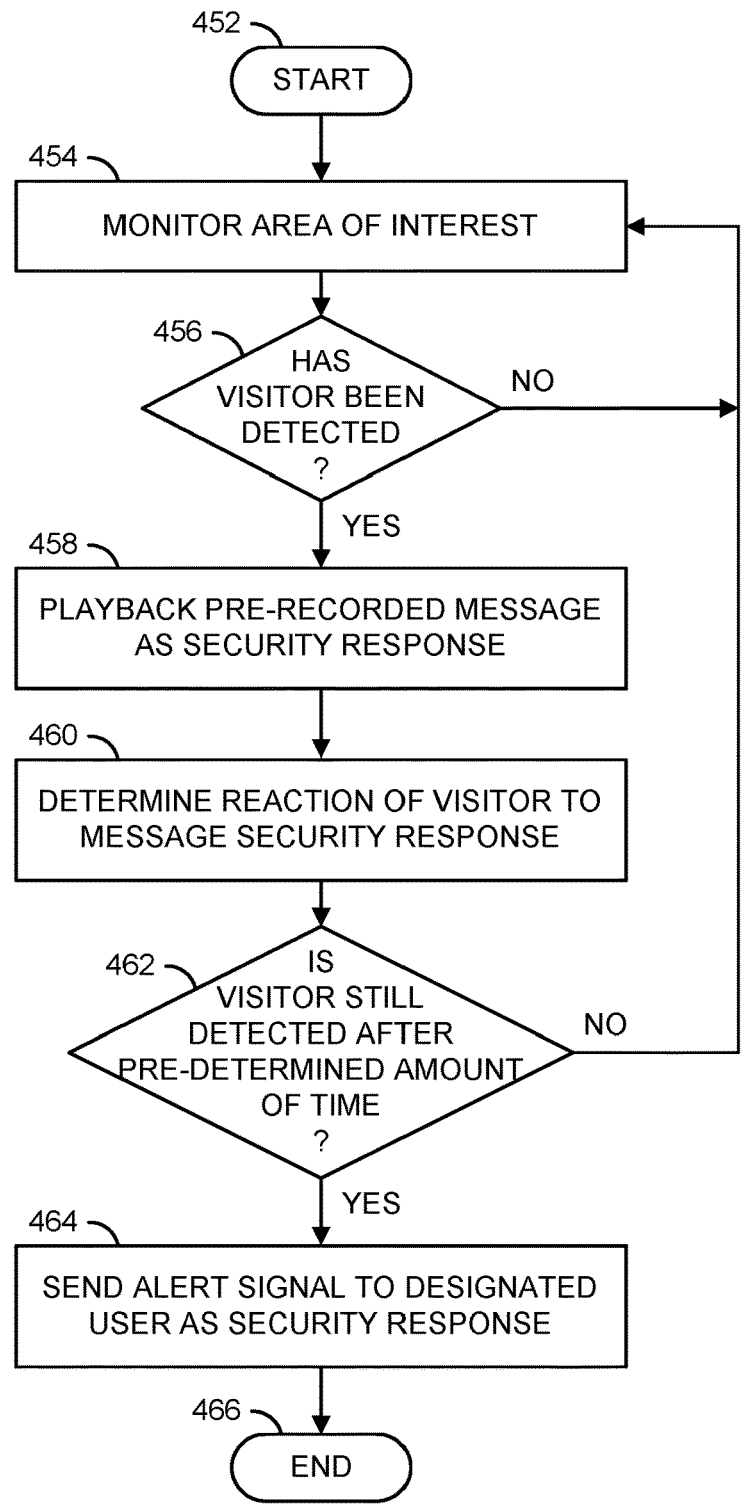
FIG. 9 is a flow diagram illustrating a method for determining a reaction of a visitor to a security response.

Referring to FIG. 9, a method (or process) 450 is shown. The method 450 may determine a reaction of a visitor to a security response. The method 450 generally comprises a step (or state) 452, a step (or state) 454, a decision step (or state) 456, a step (or state) 458, a step (or state) 460, a decision step (or state) 462, a step (or state) 464, and a step (or state) 466.

The state 452 may start the method 450. In the state 454, the smart security camera 100 may monitor the area of interest. Next, the method 450 may move to the decision state 456. In the decision state 456, the processor 156 may determine whether a visitor has been detected. If the visitor has not been detected, the method 450 may return to the state 454. If the visitor has been detected, the method 450 may move to the state 458.

In the state 458, the speaker 174 may playback the pre-recorded message as a security response. Next, in the state 460, the processor 156 may determine the reaction of the visitor to the message security response. For example, video analysis may be implemented to determine a behavior of the visitor in response to the audio message. Next, the method 450 may move to the decision state 462.

In the decision state 462, the processor 152 may determine whether the visitor is still detected after a pre-determined amount of time. If the visitor is no longer detected, the method 450 may return to the state 454. If the visitor is still detected, the method 450 may move to the state 464. In the state 464, the processor 152 may enable the communication module 162 to send an alert signal to the designated user as the security response. Next, the method 450 may move to the state 466. The state 450 may end the method 466.

Figure 10:
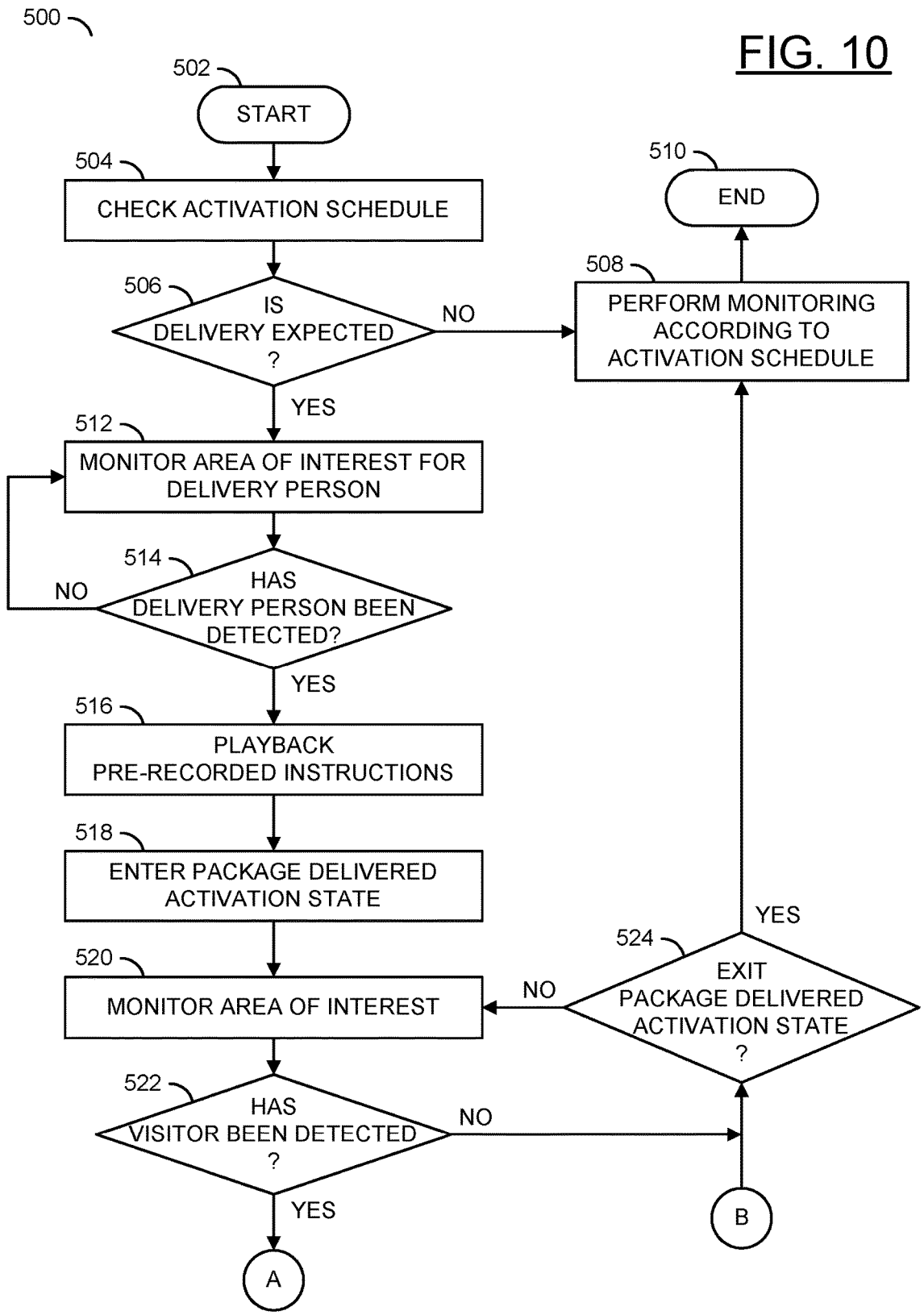
FIG. 10 is a flow diagram illustrating a first portion of a method for security responses when a package delivery has been detected.

Referring to FIG. 10, a method (or process) 500 is shown. The method 500 may perform a first portion of security responses when a package delivery has been detected. The first portion of the method 500 generally comprises a step (or state) 502, a step (or state) 504, a decision step (or state) 506, a step (or state) 508, a step (or state) 510, a step (or state) 512, a decision step (or state) 514, a step (or state) 516, a step (or state) 518, a step (or state) 520, a decision step (or state) 522, and a decision step (or state) 524.

The state 502 may start the method 500. In the state 504, the processor 152 may check the activation schedule. Next, the method 500 may move to the decision state 506. In the decision state 506, the processor 152 may determine whether a delivery is expected. For example, the processor 152 may compare the schedule with the current date and/or time. In another example, the smart security light 100 may be configured to receive information (e.g., via an API) from a delivery service indicating when a package may be delivered. If the delivery is not expected, the method 500 may move to the state 508. In the state 508, the smart security light 100 may perform monitoring according to the activation schedule. Next, the method 500 may move to the state 510. The state 510 may end the method 500. In the decision state 506, if the delivery is expected, the method 500 may move to the state 512.

In the state 512, the smart security light 100 may monitor the area of interest (e.g., the security zone 234) for the delivery person. Next, the method 500 may move to the decision state 514. In the decision state 514, the processor 152 may determine whether the delivery person has been detected (e.g., based on video analysis). If the delivery person has not been detected, the method 500 may return to the state 512. If the delivery person has been detected, the method 500 may move to the state 516.

In the state 516, the processor 152 may cause the speaker 174 to playback pre-recorded instructions. Next, in the state 518, the processor 152 may cause the smart security light 100 to enter a package delivered activation state (e.g., by activating and/or deactivating one or more security responses and/or components of the smart security light 100). In the state 520, the smart security light 100 may monitor the area of interest. Next, the method 500 may move to the decision state 522.

In the decision state 522, the processor 152 may determine whether a visitor has been detected. For example, video analysis may be implemented and/or the signal AUTH may be detected. If the visitor has not been detected, the method 500 may move to the decision state 524. In the decision state 524, the processor 152 may determine whether to exit the package delivered activation state. For example, the smart security light 100 may remain in the package delivered state until the homeowner has the package. In another example, the package delivered state may remain active for a pre-determined amount of time (e.g., a time when the homeowner returns from work). If the package delivered activation state is not exited, the method 500 may return to the state 520. If the package delivered activation state is exited, the method 500 may move to the state 508. In the decision state 522, if the visitor has been detected, the method 500 may move to the state 526 (to be described in association with FIG. 11).

Figure 11:
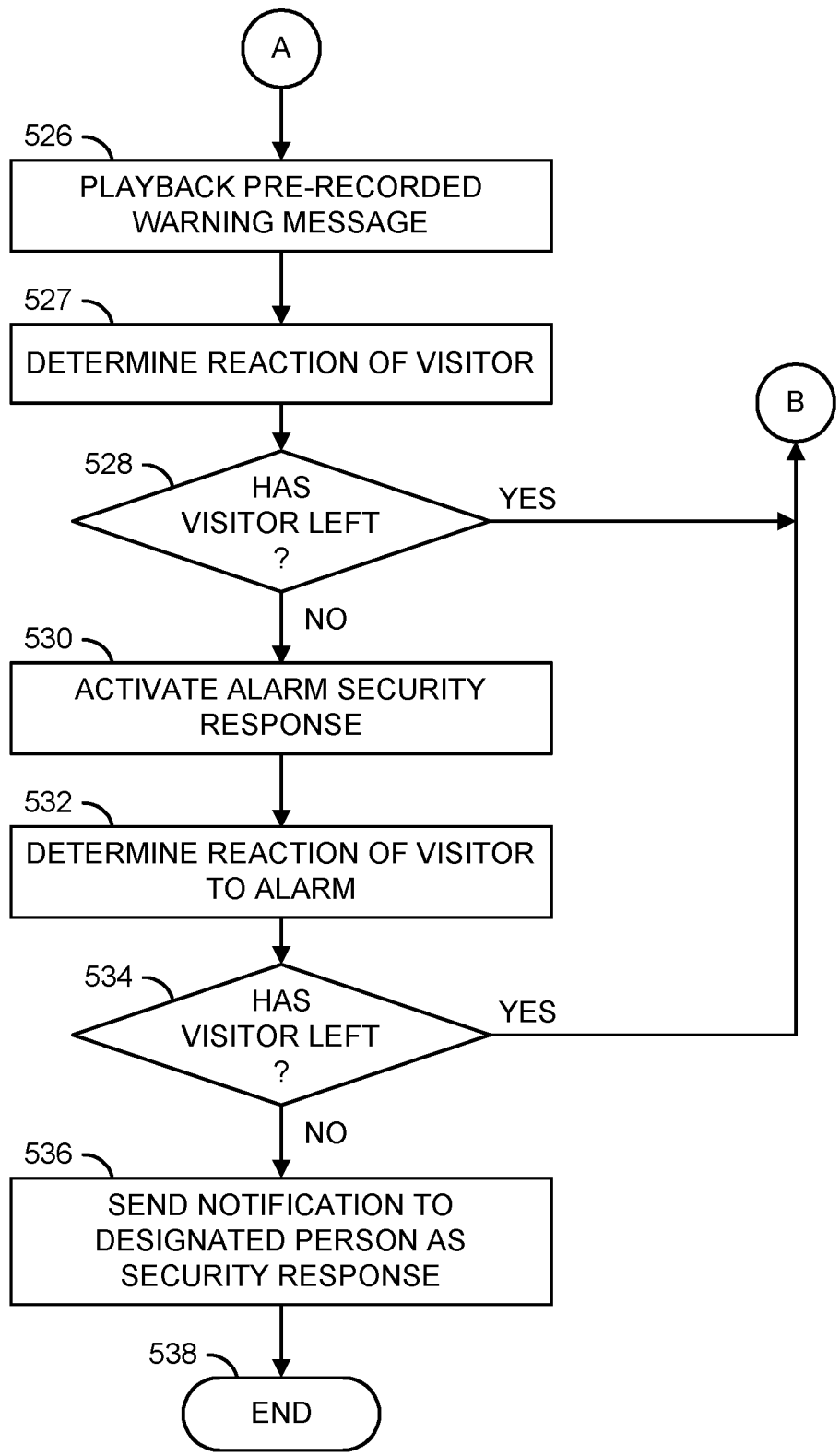
FIG. 11 is a flow diagram illustrating a second portion of a method for security responses when a package delivery has been detected.

Referring to FIG. 11, a method (or process) 500 is shown. The method 500 may perform a second portion of security responses when a package delivery has been detected. The second portion of the method 500 generally comprises a step (or state) 526, a decision step (or state) 528, a step (or state) 530, a step (or state) 532, a decision step (or state) 534, a step (or state) 536, and a step (or state) 538.

In the state 526, the processor 152 may cause the speaker 174 to playback a pre-recorded warning message. In the state 527, the processor 152 may determine the reaction of the visitor to the warning message. For example, the video analysis may be performed on the video frames recorded during and/or after the warning message was played to determine a behavior of the visitor. Next, the method 500 may move to the decision state 528.

In the decision state 528, the processor 152 may determine whether the visitor has left. If the visitor has left, the method 500 may move to the decision state 524 (described in association with FIG. 10). If the visitor has not left, the method 500 may move to the state 530.

In the state 530, the processor 152 may activate the alarm security response. Next, in the state 532, the processor 152 may determine the reaction of the visitor to the alarm. For example, the video analysis may be performed on the video frames recorded during and/or after the alarm was activated to determine a behavior of the visitor. Next, the method 500 may move to the decision state 534.

In the decision state 534, the processor 152 may determine whether the visitor has left. If the visitor has left, the method 500 may move to the decision state 524 (described in association with FIG. 10). If the visitor has not left, the method 500 may move to the state 536. In the state 536, the processor 152 may cause the communication module 162 to send a notification to the user devices 220a-220n of the designated person as a security response. In some embodiments, the authorities 214 may be notified. Next, the method 500 may move to the state 538. The state 538 may end the method 500.

Figure 12:
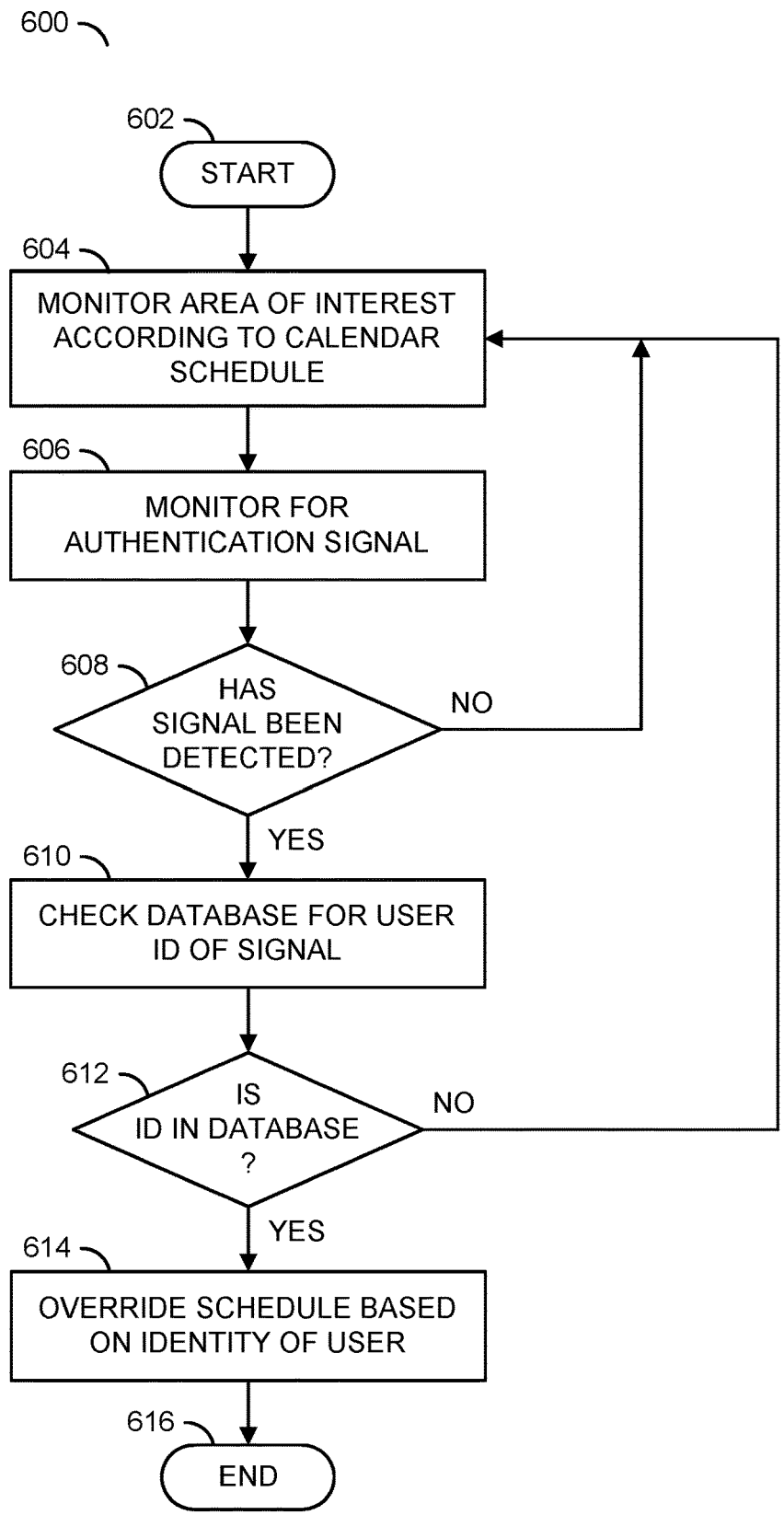
FIG. 12 is a flow diagram illustrating a method for overriding a schedule based on an identification.

Referring to FIG. 12, a method (or process) 600 is shown. The method 600 may override a schedule based on an identification. The method 600 generally comprises a step (or state) 602, a step (or state) 604, a step (or state) 606, a decision step (or state) 608, a step (or state) 610, a decision step (or state) 612, a step (or state) 614, and a step (or state) 616.

The state 602 may start the method 600. In the state 604, the smart security camera 100 may monitor the area of interest according to the calendar schedule. For example, the security responses may be armed and/or disarmed based on the information in the schedule. Next, in the state 606, the smart security light may monitor for the authentication signal (e.g., the signal AUTH from the wireless ID device 240 and/or the signal AUTH' from one or more of the user devices 220a-220n). Next, the method 600 may move to the decision state 608.

In the decision state 608, the processor 152 may determine whether the authentication signal has been detected. If the authentication signal has not been detected, the method 600 may return to the state 604. If the authentication signal has been detected, the method 600 may move to the state 610. In the state 610, the processor 152 may check the database 218 (or the memory 154) for the user ID associated with the signal AUTH (or the signal AUTH'). For example, the data from the ID block 246 may be compared with data stored in the database 218 and/or the memory 154. Next, the method 600 may move to the decision state 612.

In the decision state 612, the processor 152 may determine whether the ID corresponding to the authentication signal is in the database 218 (or the memory 154). If the ID is not in the database 218 (or the memory 154), the method 600 may return to the state 604. For example, if the calendar schedule indicated an alarm security response, the smart security response may sound the alarm in response to a visitor being detected. In the decision state 612, if the ID is in the database 218 (or the memory 154), the method 600 may move to the state 614. In the state 614, the processor 152 may override the scheduled security response status based on the identity of the user. For example, if a family member is detected, the security responses may be disarmed for the friendly visitor. Next, the method 600 may move to the state 616. The state 616 may end the method 600.

The functions performed by the diagrams of FIGS. 6-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a camera sensor configured to capture video data of an area of interest; and
   a processor configured to (i) process said video data, (ii) generate control signals used to initiate security responses and (iii) execute computer readable instructions, wherein (A) said computer readable instructions are executed by said processor to (a) determine a first activation state and a second activation state for said security responses, (b) determine a status of a visitor in said area of interest in response to an analysis of said video data, (c) select one of said control signals to initiate said security responses based on (i) said status of said visitor and (ii) said activation state and (d) determine a reaction of said visitor in response to said security responses, (B) said first activation state for said security responses is selected based on a schedule, (C) said visitor is identified using a wireless identification signal and (D) when said wireless identification signal is detected, said second activation state for said security responses based on said wireless identification signal temporarily overrides said first activation state.

2. The apparatus according to claim 1, wherein said status of said visitor is determined based on at least one of facial recognition and behavior analysis performed on said visitor in said video data.

3. The apparatus according to claim 1, wherein said first activation state and said second activation state are further determined based on a timing system.

4. The apparatus according to claim 3, wherein said timing system is implemented as a user-configurable calendar.

5. The apparatus according to claim 1, wherein said processor is further configured to perform said analysis of said video data.

6. The apparatus according to claim 1, wherein (i) said analysis of said video data is performed by an external service and (ii) said computer readable instructions are configured to accept data from said external service.

7. The apparatus according to claim 1, wherein said security responses comprise an automatic greeting.

8. The apparatus according to claim 1, wherein said security responses comprise an alarm.

9. The apparatus according to claim 1, wherein said security responses comprise transmitting a notification to a designated individual.

10. The apparatus according to claim 9, wherein said notification is sent to a smartphone of said designated individual.

11. The apparatus according to claim 9, wherein said designated individual is at least one of a home security service, a police service and a neighbor.

12. The apparatus according to claim 1, wherein (i) said status of said visitor is determined to be a potential burglar and (ii) said security responses comprise at least one of (a) an automatic warning message and (b) an alarm.

13. The apparatus according to claim 1, wherein (i) said status of said visitor is determined to be a delivery person and (ii) said security responses comprise at least one of (a) automatic delivery instructions and (b) adjusting said activation state to monitor for potential package thieves.

14. The apparatus according to claim 13, wherein said delivery instructions comprise instructing said delivery person to place a package in a package deposit container.

15. The apparatus according to claim 14, wherein said package deposit container comprises a wireless signal generator configured to provide a status of said package deposit container.

16. The apparatus according to claim 14, wherein (i) said activation state to monitor for a potential package thief comprises identifying a zone near said package container and (ii) a notification is generated in response to an invasion of said zone.

17. The apparatus according to claim 1, wherein (i) said status of said visitor is determined to be a pre-authorized person and (ii) said security responses are disabled.

18. The apparatus according to claim 17, wherein (i) said pre-authorized person is identified using a wireless identification signal and (ii) said wireless identification signal is generated by at least one of a smartphone, a radio-frequency identification (RFID) device, smart tags and a Bluetooth device.

19. The apparatus according to claim 1, wherein an additional one of said security responses is activated based on said reaction of said visitor.

* * * * *